(12) United States Patent
Cogswell et al.

(10) Patent No.: US 11,266,864 B2
(45) Date of Patent: Mar. 8, 2022

(54) SYSTEMS AND METHODS OF REMOTE MONITORING OF EQUIPMENT

(71) Applicant: Tyco Fire Products LP, Lansdale, PA (US)

(72) Inventors: Jeremy Tyler Cogswell, Johnston, RI (US); Arash Agan, Providence, RI (US); Cassandra Lyn DeNunzio, Cranston, RI (US)

(73) Assignee: Tyco Fire Products LP, Lansdale, PA (US)

( * ) Notice: Subject to any disclaimer, the term of this patent is extended or adjusted under 35 U.S.C. 154(b) by 283 days.

(21) Appl. No.: 16/252,306

(22) Filed: Jan. 18, 2019

(65) Prior Publication Data
US 2019/0224511 A1 Jul. 25, 2019

Related U.S. Application Data

(60) Provisional application No. 62/620,613, filed on Jan. 23, 2018, provisional application No. 62/620,605, filed on Jan. 23, 2018, provisional application No. 62/620,599, filed on Jan. 23, 2018, provisional application No. 62/620,590, filed on Jan. 23, 2018.

(51) Int. Cl.
*G01N 17/02* (2006.01)
*A62C 37/50* (2006.01)
(Continued)

(52) U.S. Cl.
CPC .............. *A62C 37/50* (2013.01); *A62C 35/68* (2013.01); *G01K 1/024* (2013.01); *G01K 13/00* (2013.01);
(Continued)

(58) Field of Classification Search
CPC .............................................. G01N 17/02–043
See application file for complete search history.

(56) References Cited

U.S. PATENT DOCUMENTS 3,609,549 A * 9/1971 Hausler ................ G01N 27/041
324/700
4,056,445 A * 11/1977 Gauntt .................... G01N 17/02
205/775.5
(Continued)

FOREIGN PATENT DOCUMENTS

| CN | 1547032 A | 11/2004 |
|---|---|---|
| EP | 0 844 04 | 7/1983 |
| GB | 2 504 214 | 1/2014 |

OTHER PUBLICATIONS

International Search Report and Written Opinion for International Application No. PCT/US2019/014325, dated Jul. 8, 2019, 18 pages.
(Continued)

*Primary Examiner* — Alexander S Noguerola
(74) *Attorney, Agent, or Firm* — Foley & Lardner LLP

(57) ABSTRACT

A corrosion monitoring device includes a sensor assembly and a detector circuit. The sensor assembly includes at least one sensor portion disposed in an interior of a pipe in a fire sprinkler system for sensing corrosion of a wall of the pipe. The detector circuit transmits an electrical signal through the at least one sensor portion, monitors an electrical characteristic of the at least one sensor portion based on the electrical signal, compares at least one of the monitored electrical characteristic and a change in the electrical characteristic of the at least one sensor portion to at least one of a predetermined value and a previously monitored electrical characteristic, determines a corrosion status indicative of at least one of a corrosion level and a rate of corrosion of the pipe wall based on the comparison, and outputs an indication of the corrosion status.

14 Claims, 15 Drawing Sheets

(51) Int. Cl.
  *G01K 13/00* (2021.01)
  *G01N 17/04* (2006.01)
  *G08B 21/18* (2006.01)
  *G01N 27/02* (2006.01)
  *G01K 1/024* (2021.01)
  *G01N 27/04* (2006.01)
  *A62C 35/68* (2006.01)
  *G01N 27/20* (2006.01)

(52) U.S. Cl.
  CPC ........... *G01N 17/043* (2013.01); *G01N 27/02* (2013.01); *G01N 27/04* (2013.01); *G08B 21/182* (2013.01); *G01N 27/20* (2013.01)

(56) References Cited

U.S. PATENT DOCUMENTS

| | | | |
|---|---|---|---|
| 5,649,598 A * | 7/1997 | MacDonald, III | A62C 35/68 169/16 |
| 2007/0120572 A1 | 5/2007 | Chen et al. | |
| 2009/0068060 A1 | 3/2009 | Alfermann et al. | |
| 2012/0031629 A1 | 2/2012 | Kochelek et al. | |
| 2014/0332240 A1 | 11/2014 | Kochelek et al. | |

OTHER PUBLICATIONS

Kampmeier, Bjorn, "Risikogerechte Brandschutzlosungen fur den mehrgeschossigen Holzabau", Institut fur Baustoffe, Massivbau und Brandschutz, 2008, 196 pages.

* cited by examiner

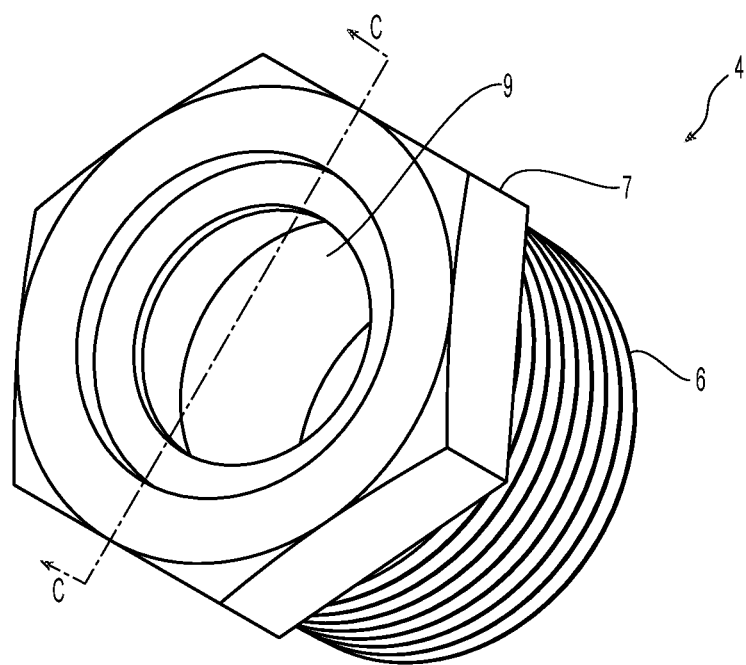
Fig. 3A
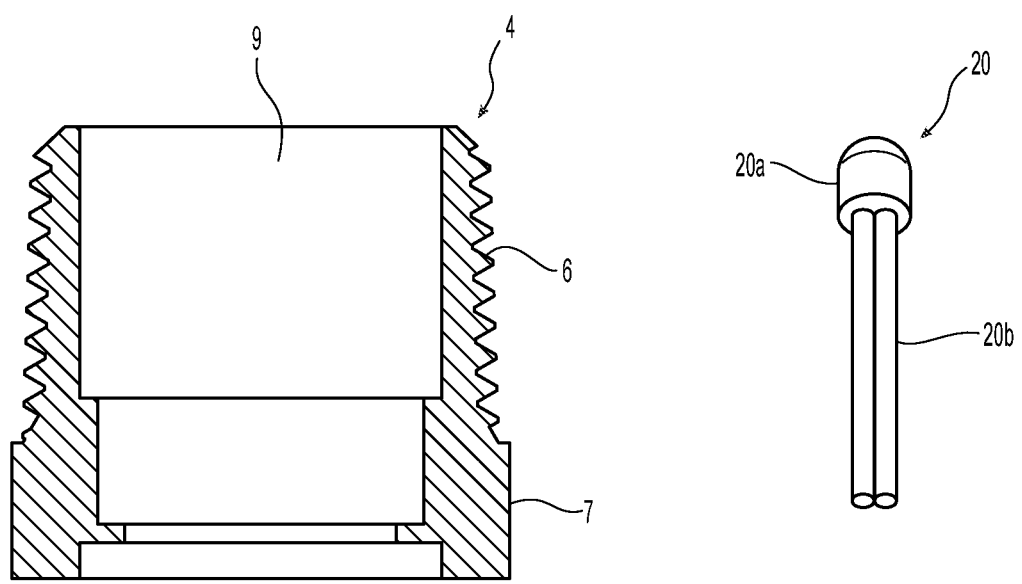
Fig. 3B
Fig. 4

SYSTEMS AND METHODS OF REMOTE MONITORING OF EQUIPMENT

CROSS-REFERENCE TO RELATED APPLICATIONS

The present disclosure claims the benefit of and priority to U.S. Provisional Application No. 62/620,599, titled "SENSOR ASSEMBLY FOR MONITORING OF EQUIPMENT," filed Jan. 23, 2018, U.S. Provisional Application No. 62/620,590, titled "APPARATUS AND METHOD FOR REMOTE MONITORING OF EQUIPMENT," filed Jan. 23, 2018, U.S. Provisional Application No. 62/620,605, titled "SYSTEM AND METHOD FOR REMOTE MONITORING OF EQUIPMENT," filed Jan. 23, 2018, and U.S. Provisional Application No. 62/620,613, titled "APPARATUS AND METHOD FOR REMOTE MONITORING OF EQUIPMENT," filed Jan. 23, 2018, the disclosures of which are incorporated herein by reference in their entireties.

BACKGROUND

Corrosion is a natural process that converts refined metals to a chemically stable formation. The process is a gradual destruction of metals by chemical/electrochemical reaction with their surrounding environment.

SUMMARY

Various aspects are directed to systems and methods of monitoring the level of the corrosion (e.g., loss of metal given in weight per area, mils, millimeters, centimeters, or some other measure of corrosion) and/or the rate of corrosion (e.g., given in mils per year "mpy" or millimeters per year "mmy") of equipment that is exposed to a corrosive environment (also referred to as "equipment environment" herein). The monitoring device can monitor equipment such as a pipe that can be filled with water, e.g., pipes in a fire sprinkler system. The monitoring device can include a sensor assembly with at least one corrosion sensor that can be used to determine at least one of a level of corrosion and a rate of corrosion of the equipment being monitored. The corrosion monitoring can be based on at least one electrical characteristic and/or a change in the electrical characteristic of the at least one corrosion sensor. For example, the electrical characteristic being monitored can be at least one of continuity (an open or closed circuit status) of each corrosion sensor, a resistance value of each corrosion sensor, a voltage value of the corrosion sensor (e.g., a voltage at a predetermined location, a voltage drop across the corrosion sensor, or some other voltage indication), a current value through the corrosion sensor, and an inductance value of the corrosion sensor. The change in the electrical characteristic can be a change in the actual value of the monitored electrical characteristic and/or a percentage change in the value. Various electrical characteristics can be monitored where there is a correlation to the corrosion in the equipment. The monitoring device can include a corrosion detector circuit configured to transmit an electrical signal through the sensor assembly and measure an electrical characteristic of the at least one corrosion sensor that forms at least a part of the sensor assembly. The monitored electrical characteristic can be used to determine information that relates to the corrosion level and/or the rate of corrosion of the equipment being monitored. For example, the monitored electrical characteristic and/or a change in the electrical characteristic of at least one corrosion sensor can be compared to a predetermined value and/or a previously monitored electrical characteristic for that corrosion sensor in order to determine the information that relates to the corrosion level and/or the rate of corrosion of the equipment being monitored.

In some embodiments, the sensor assembly includes at least one wire loop and each wire loop includes a coupon portion as the corrosion sensor portion. The coupon portion can corrode at a rate that can be correlated to the equipment being monitored. A geometric shape of the coupon portion can include a portion having a constant diameter (uniform thickness) such as, e.g., a cylindrical shape. The corrosion monitoring can be based on an electrical characteristic or a change in the electrical characteristic of the coupon portion in each wire loop. For example, the electrical characteristic being monitored can be at least one of a continuity (an open or closed circuit status) of the coupon portion, a resistance value of the coupon portion (e.g., using at least one of a current through and a voltage across the wire loop), a voltage value of the coupon portion (e.g., a voltage at a predetermined location, a voltage drop across the coupon portion, or some other voltage indication), a current value through the wire loop and thus the coupon portion, and an inductance value of the coupon portion. The non-coupon portion of the wire loop may not significantly affect the measurement of the electrical characteristic of the coupon portion. The change in the electrical characteristic can be a change in the actual value of the monitored electrical characteristic and/or a percentage change in the value. Various characteristics can be monitored on coupon portion where there is a correlation to the corrosion in the equipment.

In some embodiments, the monitoring device provides for remote monitoring of the level and/or rate of corrosion of the equipment in a simple and cost effective manner. For example, the monitoring device can include a transmission circuit that transmits information related to the monitored electrical characteristic and/or change in electrical characteristic of the corrosion sensor, e.g., coupon portion, to an external device via a network for calculating the level and/or rate of corrosion.

In some embodiments, the monitoring device includes a corrosion rate circuit that calculates at least one of a level of corrosion and a rate of corrosion for the equipment based on the information from the corrosion detector circuit. The corrosion rate circuit can correlate the determined information that relates to the corrosion level and/or the rate of corrosion of the equipment being monitored to an estimated loss of weight per area of the equipment due to corrosion to determine the at least one of the level of corrosion and the rate of corrosion for the monitored equipment. The corrosion rate circuit can be disposed remotely and a communication processing system is connected to the plurality of monitoring devices and the corrosion rate circuit via a network. The communication processing system can receive the determined information that relates to corrosion of the one or more pieces of equipment from each of the plurality of monitoring devices and transmits the determined information to the corrosion rate circuit. The corrosion rate circuit can perform the calculation of the at least one of the level of corrosion and the rate of corrosion for the monitored piece of equipment. The corrosion rate circuit can correlate the determined information to an estimated loss of weight per area of the monitored piece of equipment due to corrosion, and then correlates the estimated loss of weight per area of the monitored piece of equipment to the at least one of the level of corrosion and the rate of corrosion for the monitored piece of equipment.

The monitoring device can include a relay circuit that selectively provides at least one of a voltage to and a current through the corrosion sensors, e.g., coupon portions, which is measured and used to determine at least one of a corrosion level, a corrosion rate, and a presence of water. The relay circuit is operated for a predetermined duration of time with a time period between the selective connection of the corrosion sensors to the power source being based on at least one of a predetermined value and a performance criteria, which can include at least one of a required battery life, remaining battery life, a level of corrosion of the equipment, and/or a rate of corrosion of the equipment.

At least one aspect relates to a method of monitoring corrosion for an equipment that includes transmitting an electrical signal through at least one corrosion sensor and measuring an electrical characteristic of the corrosion sensor that can be used to determine information that relates to the corrosion level and/or the rate of corrosion of the equipment being monitored such as, e.g., pipes in a fire sprinkler system. For example, the monitored electrical characteristic or a change in the electrical characteristic of at least one corrosion sensor can be compared to a predetermined value or a previously monitored electrical characteristic for that corrosion sensor in order to determine the information that relates to the corrosion level or the rate of corrosion of the equipment being monitored. The corrosion sensor can include a coupon that can corrode at a rate that can be correlated to the rate of corrosion of the equipment being monitored. In some embodiments, the method of monitoring corrosion can include transmitting a current through at least one corrosion sensor, e.g., coupon portion, and measuring an electrical characteristic of at least the corrosion sensor. For example, the electrical characteristic being monitored can be at least one of continuity (an open or closed circuit status) of each corrosion sensor, a resistance value of each corrosion sensor, a voltage value of the corrosion sensor (e.g., a voltage at a predetermined location, a voltage drop across the corrosion sensor, or some other voltage indication), a current value through the corrosion sensor, and an inductance value of the corrosion sensor. The change in the electrical characteristic can be a change in the actual value of the monitored electrical characteristic and/or a percentage change in the value. Various electrical characteristics can be monitored where there is a correlation to the corrosion in the equipment.

The method can include transmitting information related to the electrical characteristic of the corrosion sensor, e.g., coupon portion, for calculating at least one of a level of corrosion and a rate of corrosion for the equipment being monitored. In some embodiments, the information is transmitted to an external device via a network for calculating the level or rate of corrosion. In some embodiments, the calculating includes correlating the determined information that relates to the corrosion level or the rate of corrosion of the equipment being monitored to an estimated loss of weight per area of the equipment to determine the at least one of the level of corrosion and the rate of corrosion for the monitored equipment.

In some embodiments, the method includes periodically measuring the electrical characteristic of the corrosion sensor, e.g., the coupon portion, for a predetermined duration of time with a time period between measurements based on at least one of a predetermined value and a performance criteria, which can include at least one of a required battery life, remaining battery life, a level of corrosion of the equipment, or a rate of corrosion of the equipment.

In some embodiments, at least one client device displays the information related to at least one of the calculated level of corrosion and the calculated rate of corrosion to a user. The displayed information can be displayed as an indication of severity of corrosion of the monitored piece of equipment in at least one of a text format and a color format. For example, the indication of severity of corrosion is displayed with at least one of a first text (e.g., "NORMAL RATE") and a first color (e.g., green) for a normal corrosion rate if the rate of corrosion for the monitored piece of equipment is less than or equal to a first predetermined mills per year (mpy) value (e.g., 0 to 3 mpy), with at least one of a second text (e.g., "INTERMEDIATE RATE") and a second color (e.g., yellow) for an intermediate corrosion rate if the rate of corrosion for the monitored piece of equipment is greater than the first predetermined mpy value (e.g., 3 mpy) and less than or equal to a second predetermined mpy value (e.g., 5 mpy), and with at least one of a third text (e.g., "ACCELERATED RATE") and a third color (e.g., red) for an accelerated corrosion rate if the rate of corrosion for the monitored piece of equipment is greater than the second predetermined mpy value (e.g., 5 mpy). In some embodiments, the corrosion rate value can be displayed in mpy. The at least one client device can be at least one of a mobile device and a stationary electronic device.

In some embodiments, at least one client device (e.g., user device, portable electronic device) displays the information related to at least one of the calculated level of corrosion and the calculated rate of corrosion to a user. The displayed information can be displayed as an indication of severity of corrosion of the monitored piece of equipment in at least one of a text format and a color format. For example, the indication of severity of corrosion is displayed with at least one of a first text (e.g., "NORMAL RATE") and a first color (e.g., green) for a normal corrosion rate if the rate of corrosion for the monitored piece of equipment is less than or equal to a first predetermined mills per year (mpy) value (e.g., 0 to 3 mpy), with at least one of a second text (e.g., "INTERMEDIATE RATE") and a second color (e.g., yellow) for an intermediate corrosion rate if the rate of corrosion for the monitored piece of equipment is greater than the first predetermined mpy value (e.g., 3 mpy) and less than or equal to a second predetermined mpy value (e.g., 5 mpy), and with at least one of a third text (e.g., "ACCELERATED RATE") and a third color (e.g., red) for an accelerated corrosion rate if the rate of corrosion for the monitored piece of equipment is greater than the second predetermined mpy value (e.g., 5 mpy). In some embodiments, the corrosion rate value can be displayed in mpy. The at least one client device can be at least one of a mobile device and a stationary electronic device.

At least one aspect relates to a sensor assembly for a corrosion monitoring device to monitor corrosion in a pipe of a fire sprinkler system. The sensor assembly includes at least one corrosion sensor portion, a plug insert, and a housing. The at least one corrosion sensor portion has a coupon portion that corrodes in an environment of a wall of a pipe at a rate corresponding to at least one of a corrosion level and a rate of corrosion of the wall based on an electrical characteristic of the at least one corrosion sensor portion. The coupon portion is cylindrical. The plug insert receives the at least one corrosion sensor portion. The housing receives the plug insert.

At least one aspect relates to a corrosion monitoring system for monitoring corrosion in a pipe of a fire sprinkler system. The monitoring device has at least one corrosion sensor. The monitoring device monitors the pipe and determines corrosion data corresponding to corrosion of the pipe, the corrosion status based on an electrical characteristic of the at least one corrosion sensor. The calculation device has a corrosion rate circuit that receives the corrosion data from the monitoring device and calculates at least one of a level of corrosion and a rate of corrosion of the pipe based on the corrosion data. At least one client device presents display data regarding the at least one of the calculated level of corrosion and the calculated rate of corrosion, the at least one receives the at least one of the calculated level of corrosion and the calculated rate of corrosion via a communication network that exchanges information between the calculation device and the at least one client device.

At least one aspect relates to a method of monitoring corrosion in a pipe of a fire sprinkler system using a corrosion monitor. The method includes determining, by a monitoring device using at least one corrosion sensor, corrosion data corresponding to corrosion of the pipe based on an electrical characteristic of the at least one corrosion sensor. The method includes calculating, by a corrosion rate circuit of a calculating device, at least one of a level of corrosion and a rate of corrosion for the pipe based on the corrosion data. The method includes presenting, by at least one client device, display data regarding the at least one of the calculated level of corrosion and the calculated rate of corrosion.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 3A is a perspective view of a housing of a sensor assembly;
FIG. 3B is a side cross-sectional view of a housing;
FIG. 4 is a perspective view of a temperature sensor.

DETAILED DESCRIPTION

Figure 1A:
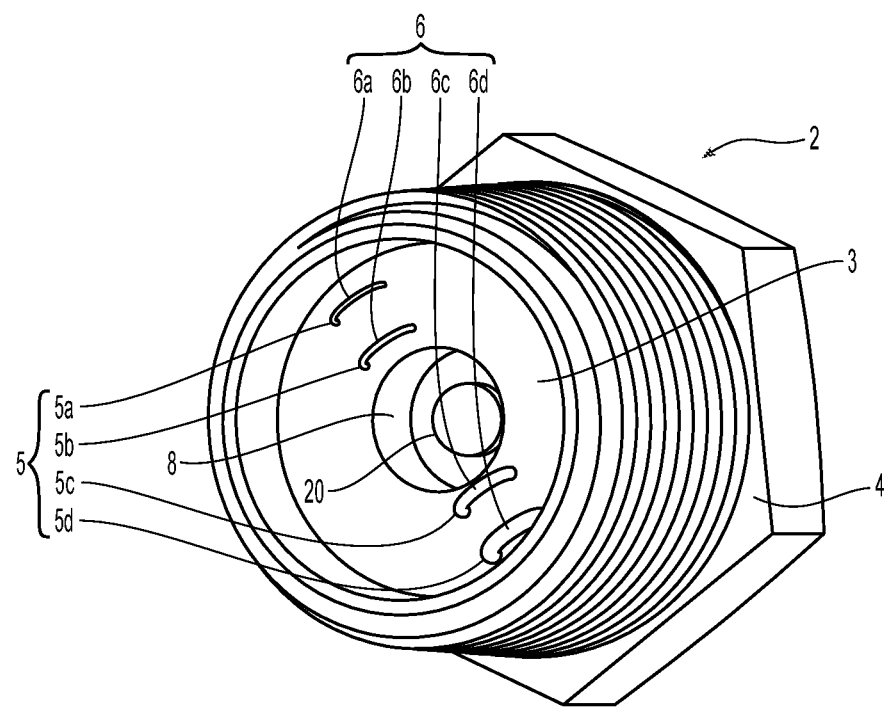
FIG. 1A is a perspective view of a sensor assembly.
Figure 1B:
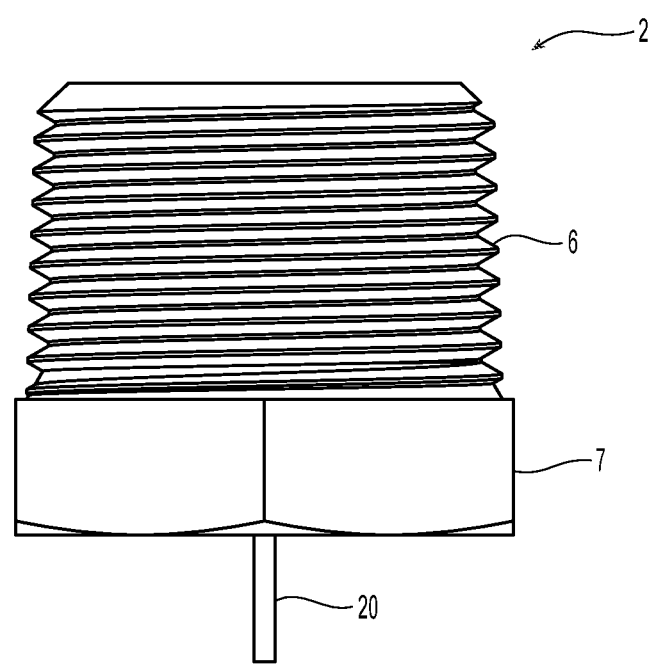
FIG. 1B is a side view of a sensor assembly.
Figure 1C:
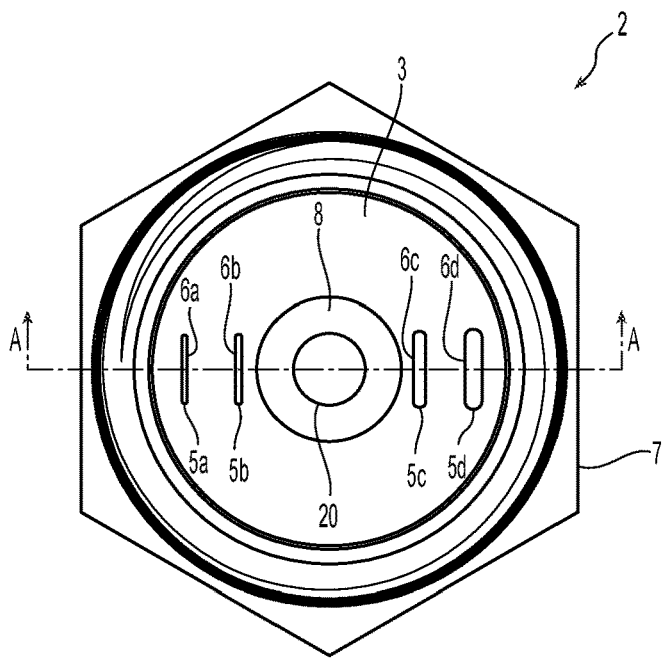
FIG. 1C is a top view of a sensor assembly.
Figure 1D:
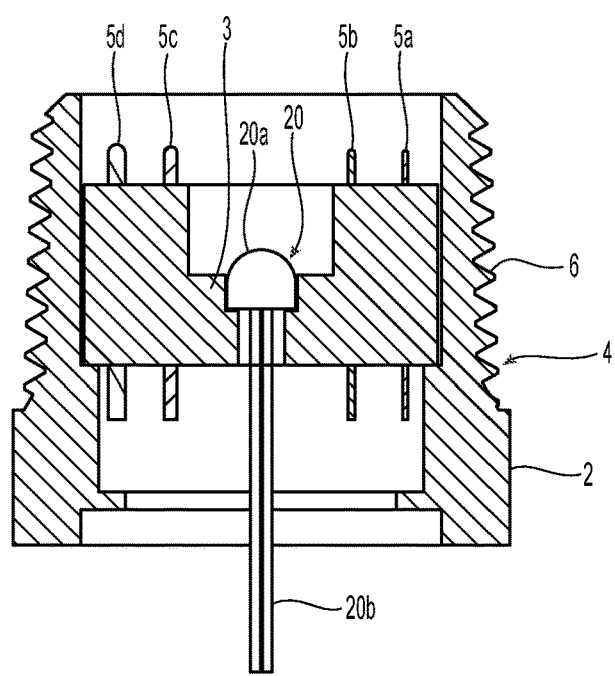
FIG. 1D is a side cross-sectional view of a sensor assembly.

The present disclosure generally relates to monitoring of equipment in corrosive or potentially corrosive environments. More particularly, the present disclosure relates to systems, methods, and sensor devices used to remotely monitor corrosion, including the current level of the corrosion and the rate of corrosion, of equipment in a corrosive environment. The equipment being monitored can be, for example, pipes in piping systems (e.g., in fire suppression systems), which are pervasive in a variety of businesses, from restaurants to hotels. The level of the corrosion of a piece of equipment relates to the amount of corrosion the equipment has experienced (e.g., weight loss per area, loss of thickness of the metal, or some other measure of corrosion). In addition, measuring the rate of corrosion will help predict when a portion of the equipment (e.g., pipe walls) will be so thin that there is high likelihood of failure, e.g., leaks, and/or there could be a buildup that can cause blockage. Thus, measuring the rate of corrosion gives the user or business time to schedule maintenance instead of performing emergency maintenance on the piping systems. Accordingly, collecting the level of the corrosion and the corrosion rates will also help notify the user or business of potential problems (e.g., blockages and/or leaks in the pipes) caused by the corrosion.

In some instances, because there is no way to completely eliminate the corrosion process, in time, the corrosion of the components in a system can lead to damage and potential catastrophic failure. Although there are techniques to minimize the corrosion process, e.g., using a sacrificial layer/coating on metals, using chemical inhibitors, and/or using inert gases to displace the oxygen in the system, there are currently no methods to completely stop the corrosion process. For example, corrosion of pipes in a fire sprinkler system can result in blockage of pipes and/or leaks that can lead to temporary shutdowns of the systems, reduced effectiveness of fire sprinkler design, total fire sprinkler replacement, loss of property due to a failure in which the fire sprinkler system fails to protect the equipment it is designed to safeguard, loss of production, and potential personal injury.

There are typically two main causes of corrosion: generalized corrosion (red/black rust) and microbiologically influenced corrosion (MIC). Generalized corrosion is commonly known as rust and requires water, iron, and oxygen for the rust reaction. MIC refers to corrosion due to the presence and activities of bacteria. There are three main types of bacteria, which are acid producing bacteria (APB), sulfur reducing bacteria (SRB), and iron related bacteria (IRB). Studies indicate that 40% of corrosion is influenced by MIC and 60% is general corrosion. Corrosion can flourish even in dry pipes such as in dry-type fire sprinkler systems because these pipes are never 100% dry. Trapped water and/or humid air from air compressors can create the perfect conditions for corrosion to occur.

Some systems can monitor corrosion to help predict failures before they occur. Some systems provide an in-line detection system in which the corrosion detector replaces a section of pipe. The corrosion detector can include an inner pipe wall that is designed to fail first (e.g., the inner wall can be thinner than the actual pipe wall). A failure of the inner wall of the corrosion detector will trigger a pressure switch that can activate an alarm. However, such systems may not measure the level and/or rate of corrosion, which can predict when a pipe failure is likely to occur, and require that a section of the pipe be cut in order to install the detector. Further, different types of detectors may be required for "wet systems" in which the pipes are always filled with water and "dry systems" in which the pipes are not filled with water until the fire system is activated. Some corrosion detector systems use coupons made of the relevant material such as steel, brass, copper, or some other relevant material that are inserted into the piping system. The coupon can be attached to a test plug such as an NPT fitting. However, such systems may require that the coupon be removed and analyzed, e.g., shipped to a lab for testing, on a periodic basis. Accordingly, such systems may not provide continuous remote monitoring of the piping. In some systems, a coupon is incorporated into the NPT plug and a visible display on the NPT plug changes color once a predetermined amount of the coupon corrodes away. Such systems, however, also cannot provide continuous remote monitoring of the piping. In addition, corrosion detection devices may only monitor corrosion and do not provide other useful information such as the temperature of the equipment environment or the presence of water in the equipment environment.

In addition to the level and/or rate of corrosion, the temperature of the equipment environment, ambient temperature outside the equipment being monitored, and/or the presence or absence of water in the equipment can also provide useful information. For example, collecting live temperature readings inside and outside the pipes of the piping system can aid in determining whether there is the potential for the pipes to freeze, an issue that might go undetected until a leak (or leaks) occurs once the piping system starts to thaw. In addition, in fire suppression systems, a frozen pipe can also impede the flow of water when the fire system is activated, potentially leaving the fire sprinkler system useless. Further, the presence of water in a "dry" piping system can mean there are potential maintenance issues (e.g., a leaking valve) that need to be resolved. Accordingly, along with determining the level and/or rate of corrosion, solutions described herein can sense the temperature of the equipment environment, the ambient temperature, and/or the presence or absence of water in the pipe. For example, sensor assemblies can include corrosion sensors, temperature sensors, and water presence sensors. In the case of a fire suppression system, determining the corrosion levels and/or rates, temperatures inside/outside a pipe in the piping system, and/or the presence or absence of water in the pipe provides for well maintained and functional piping systems and will provide for a lifesaving sprinkler system.

The techniques introduced here for monitoring corrosion, water presence and/or temperature can be embodied as special-purpose hardware (e.g., circuitry), as programmable circuitry appropriately programmed with software and/or firmware, or as a combination of special-purpose and programmable circuitry or hardware. For example, some embodiments can utilize a programmable microprocessor made by MultiTech MultiConnect® xDot™ that communicates over a LoRaWAN network. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIGS. 1A 1B, 1C, and 1D respectively depict a perspective view, a side view, a top view, and a cross-sectional view of a sensor assembly. As depicted in FIGS. 1A-1D, sensor assembly 2 includes a plug insert 3 and a housing 4. The plug insert 3 can be a separate component from housing 4 and disposed in the housing 4. The plug insert 3 can be secured in the housing 4 via a press fit. The plug insert 3 can be secured housing 4 using a threaded connection. The plug insert 3 and the housing 4 can be integral. The sensor or sensors of sensor assembly 2 can be disposed in the plug insert 3. The sensor assembly 2 can include one or more corrosion sensors having a geometric shape that permits determination of information relating to at least one of a corrosion level and a rate of corrosion of the monitored equipment based on an electrical characteristic of the at least one corrosion sensor. The corrosion sensors can be coupon portions 6 that form at least part of wire loop 5. The ends of the wire loops 5 can be attached, e.g., by soldering or another means of attachment, to wire leads that are then routed outside the housing 4 of the sensor assembly 2. Depending on the type of sensor assembly, the sensor assembly 2 can include an equipment environment temperature sensor 20, an ambient temperature sensor (not shown), or any combination of the temperature sensors the one or more corrosion sensors. The leads from the wire loops 5 and the temperature sensors can be connected to a monitoring circuit as discussed below.

Figure 2A:
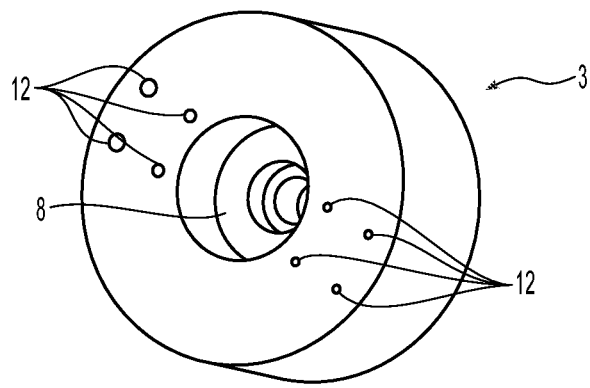
FIG. 2A is a perspective view of a plug insert of a sensor assembly.
Figure 2B:
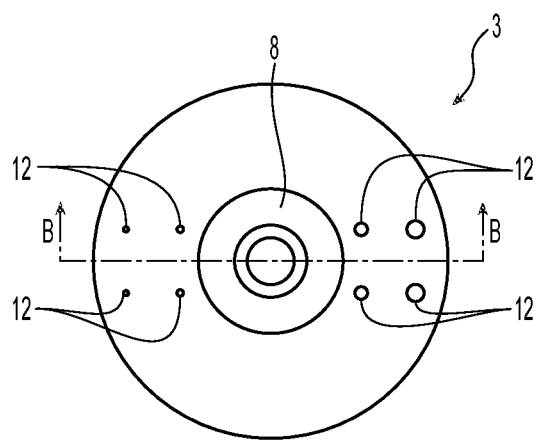
FIG. 2B is a top view of a plug insert.
Figure 2C:
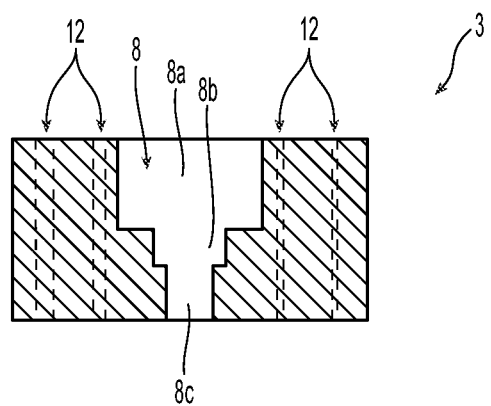
FIG. 2C is a side cross-sectional view of a plug insert.
Figure 5A:
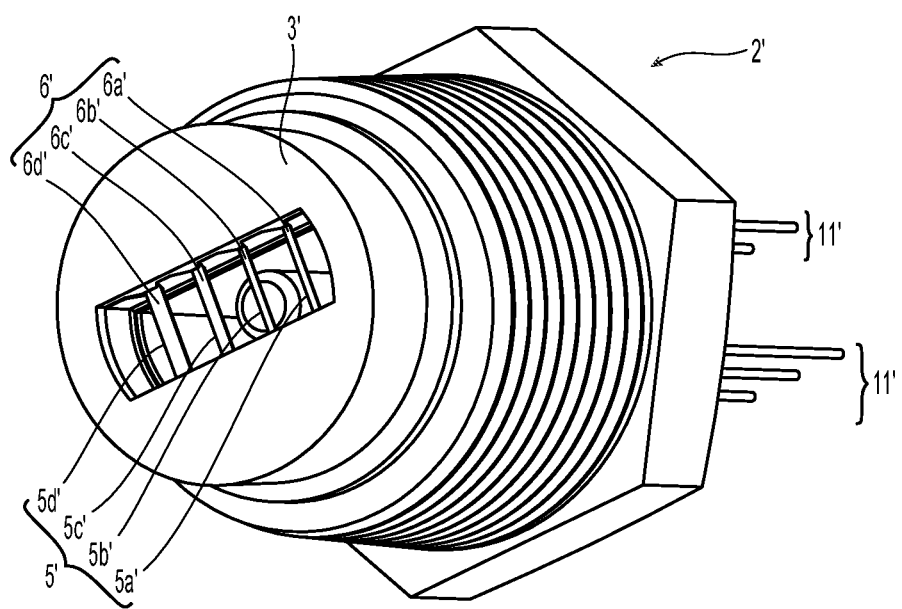
FIG. 5A is a perspective view of a sensor assembly.
Figure 5B:
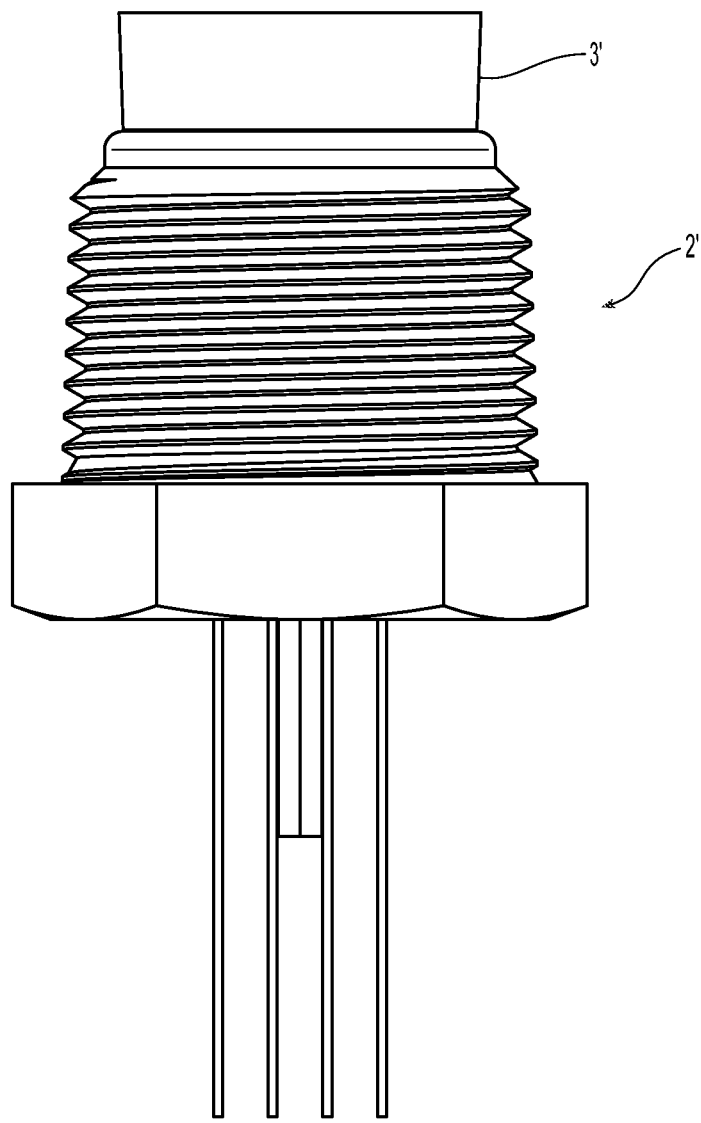
FIG. 5B is a side view of a sensor assembly.
Figure 5C:
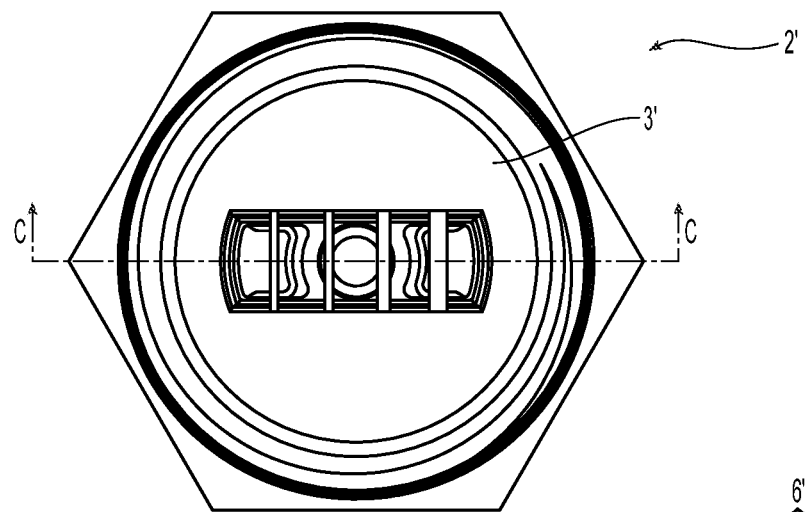
FIG. 5C is a top view of a sensor assembly.
Figure 5D:
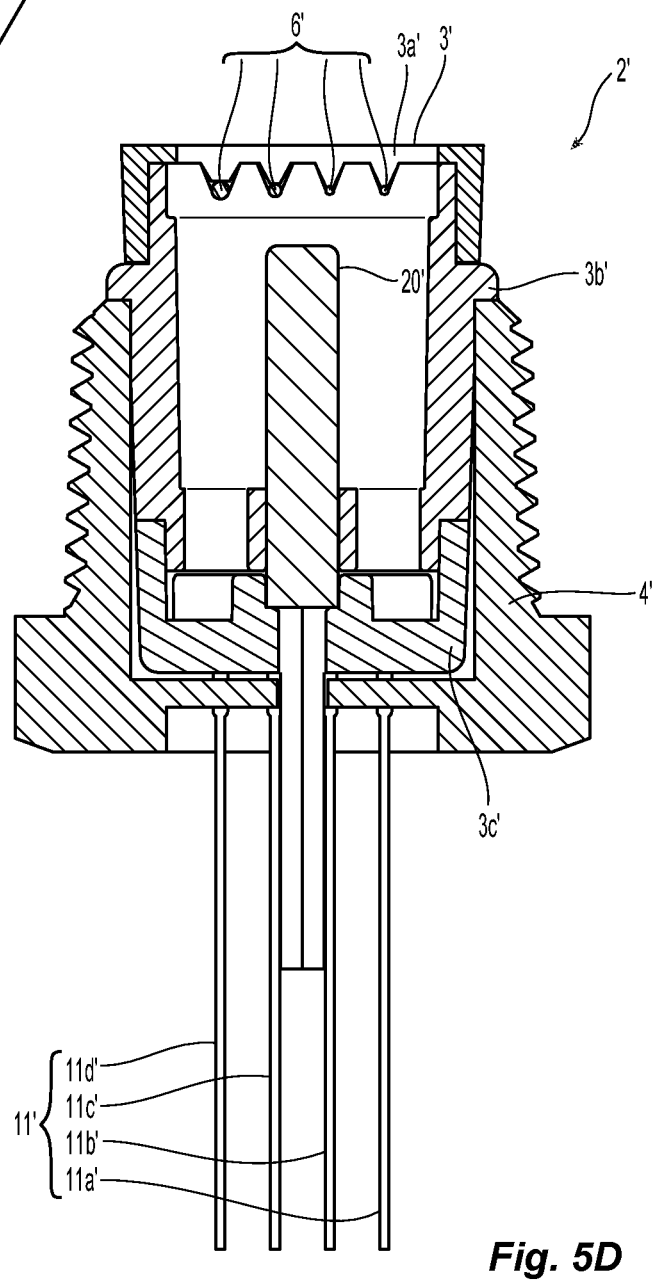
FIG. 5D is a side cross-sectional view of a sensor assembly.

FIGS. 2A-2C respectively depict a perspective view, a top view, and a cross-sectional view of a plug insert 3. The plug insert 3 can be a single unitary structure, such that the plug insert 3 is not an assembly of two or more components. As depicted in FIGS. 2A-2C, the four wire loops 5 having coupon portions 6 (see FIG. 1A) can be installed in longitudinal openings 12 (see FIGS. 2A-2C) that extend the entire length of plug insert 3. The coupon portions 6 are exposed to the corrosive equipment environment and the leads of the wire loops 5 that extend from the coupon portions are embedded in the plug insert 3 to protect the leads from the corrosive equipment environment. The cross-section of each of the longitudinal openings 12 corresponds to the cross-section of the wire loop leads of the corrosion sensors 6 that pass through openings 12. The insert plug 3 can receive a temperature sensor that measures a temperature of the equipment environment such as, for example, the inside environment of a pipe. For example, as depicted in FIGS. 2A-2C, the plug insert 3 can include a recessed portion 8 that can receive a temperature sensor 20 such as a thermistor. As depicted in FIG. 4, the temperature sensor 20 can include a sensor portion 20A and leads 20B that can be routed outside the sensor assembly 2. As depicted in FIG. 2C, to accommodate the temperature sensor 20, the recessed portion 8 can have a step profile in which an outer cavity 8a steps down to an inner cavity 8b that is smaller, e.g., in diameter, than the outer cavity 8a. The inner cavity 8b is sized to receive and hold the head 20a of the temperature sensor 20. The temperature sensor 20 can be held in the inner cavity 8b using a press fit. The temperature sensor 20 can be attached to the recessed portion 8 using at least one of a threaded connection, an adhesive, and a bonding agent. The outer cavity 8a provides protection for the head 20a while still allowing the temperature sensor 20 to sense the equipment environment, e.g., the inside of a pipe, and thus ensure accurate temperature readings of the equipment environment. The step profile can further include a step down from cavity 8b to a passage 8c that is smaller, e.g., in diameter, than cavity 8b. The passage 8c provides a passageway for the sensing leads 20b from temperature sensor 20 to exit the plug insert 3. Appropriate sealing, e.g., epoxy, can be used to fluidly isolate the recessed portion 8 from the outside of the sensor assembly 2. Depending on the design of the temperature sensor 20, the plug insert 3 can have various recess profiles to accommodate a specific temperature sensor configuration. Along with helping to protect the temperature sensor 20, the recess portion 8 can allow for the corroding metal from coupon portions 6 to migrate so that the coupon portions 6 are not affected by a buildup of corroded metal. The plug insert 3 can have a low electrical conductivity and/or a low thermal conductivity. The plug insert 3 can be made of a plastic. The plug insert 3 can be composed of a thermoset material, such as a thermoset material that is in compliance with the Underwriter Laboratories (UL) standards concerning fire suppression systems. For example, the plug insert 3 can be composed of a silicon material, urethane material, another type of thermoset material, or any combination thereof. The plug insert 3 can be made of a thermoplastic such as an acrylonitrile butadiene styrene (ABS) plastic. The composition of the plug insert 3 can be made of a metal or metal alloy, a thermoset plastic, a thermoplastic, a ceramic, or a combination thereof. The plug insert 3 or the housing 4 can be made of a material that is non-conductive electrically. The plug insert 3 or the housing 4 can be made of a material that is rated to at least 250 deg. F.

As depicted in FIGS. 3A and 3B, the housing 4 of the sensor assembly 2 can receive the plug insert 3. The housing 4 can be in the shape of a hollowed out plug with an opening 9 extending through the longitudinal axis of the housing 4. In some systems such as, e.g., fire suppression systems, to limit the leakage of fluid (e.g., air or water) from inside the pipe to the outside, the cross-sectional of opening 9 is limited by having a plurality of small openings respectively corresponding to the wire loops 5 and temperature sensor 20. In some embodiments, the openings have an area of 0.10 square inches or less. Housing 4 can include threaded section 6 for securing the sensor assembly 2 to a corresponding fitting on the equipment to be monitored, e.g., a threaded pipe end in a fire sprinkler system. The housing 4 can include a head portion 7 that is configured to facilitate the installation of the sensor assembly 2 in the equipment being monitored. The housing 4 can be in the shape of a threaded pipe plug, such as the shape of a standard threaded pipe plug. For example, the housing 4 can be in the shape of a 1 inch National Pipe Thread (NPT) threaded pipe plug (or some other standard pipe plug size) with a head portion 7 that is hexagonal in shape or some other shape that facilitates installation using a tool (e.g., a hex socket). The housing 4, including head portion 7, can have various shapes as appropriate for the equipment being monitored. The housing 4 can be made of a metal or a metal alloy, such as being made of a metal or a metal alloy that is more resistant to corrosion than the equipment being monitored. The housing 4 can be made of the same material as the equipment being monitored. The composition of the housing 4 can be made of a metal or metal alloy, a thermoset plastic, a thermoplastic, a ceramic, or a combination thereof, as appropriate. The housing 4 and the plug insert 3 can be one integrated unit. The integrated housing 4 and plug inset 3 can be injection molded. The composition of the integrated housing 4/plug 3 can be made of a metal or metal alloy, a thermoset plastic, a thermoplastic, a ceramic, or a combination thereof, as appropriate. The housing 4 can be rated for the same or higher pressures and temperatures as the equipment being monitored. The housing 4 can be rated at 2 to 3 times the operating pressure of the equipment being monitored. In the case of piping systems for fire sprinklers, the equipment typically operates from 150 psi to 175 psi; for example, the housing 4 can be rated is a range from 300 psi to 525 psi. For example, in some embodiments, such as a typical piping system for fire sprinkler systems, the threaded pipe plug is rated up to 400 psi. Of course, the pressure rating is dependent on the application and, in some embodiments, the housing 4 can be a pipe plug that is rated up to 1600 psi, such as being rated up to 3000 psi.

In some embodiments, where the the housing 4 is sufficiently large, all or part of the components associated with the control circuit for sensor assembly 2 (e.g., the power source 112, the monitoring and conversion circuit 110, and/or the transmitter circuit 116 of control unit 104 discussed below) can be disposed in the housing 4 along with or as part of the plug insert 3. The housing 4, sensor assembly 2 and/or one or more components of the control circuit (e.g., control unit 104) can form an integral device. For example, the coupon portions 6 and/or temperature sensors 20 and/or 25 and/or one or more components of control unit 104 can be embedded into a plastic plug, e.g., via an injection molding process, that is in the shape of a threaded pipe plug. Whether the outer housing is a separate component or integral to the sensing assembly (and/or one or more components of the control unit 104), the coupon portions 6 are exposed to the corrosive environment that the equipment is exposed to. For example, as discussed further below with respect to FIGS. 9A and 9B, when installed in the pipe 150, the coupon portions 6a-6d can be exposed to the internal environmental of the pipe 150 so that the monitoring device 100 can monitor the rate of corrosion of the wall of pipe 150 as discussed in more detail below.

As discussed above, the sensor assembly 2 can include one or more wire loops 5 that are disposed in the plug insert 3. Although four wire loops 5a-5d are depicted in FIGS. 1A-1D, the sensor assembly 2 can have any number of wire loops 5 such as, e.g., one, two, three, four, or more wire loops 5. Each of the wire loops 5a-5d can respectively include a coupon portion 6a-6d that is configured to corrode. At least the coupon portion 6a-6d of each of the wire loops 5a-5d can be exposed to the same corrosive environment that the monitored equipment is exposed to. For example, in an application of a piping system where the interior of a pipe 150 (see FIGS. 9A and 9B) is monitored for corrosion, the coupon portion 6 can be exposed to the interior of the pipe 150. The sensor assembly 2 can be mounted in a horizontal section of the pipe 150. The sensor assembly 2 can be mounted in a vertical section of the pipe 150 and/or in a slanted section of the pipe 150. The coupon portions 6a-6d can be made of material that is the same as the equipment being monitored, e.g. the same material as the interior wall material of pipe 150, so that a rate of corrosion of the coupon portion 6a-6d matches a rate of corrosion of the equipment being monitored. For example, for a carbon-steel pipe, the coupon portions 6a-6d can be made of the same carbon-steel material. For a black steel pipe, the coupon portions 6a-6d can be made of the same black steel material. one or more of the coupon portions 6 may not made of the same material as the equipment being monitored, but instead made of a material where the level of corrosion of the coupon portion can still be correlated to the level of corrosion (e.g., weight loss per area, loss of thickness, or some other measure of corrosion) of the monitored equipment and/or the rate of corrosion of the coupon portion can still be correlated to the rate of corrosion (e.g., mpy or mmy) of the monitored equipment. In the case of coated equipment such as coated pipes, the coupon portion 6 can be made of the base metal and not coated so as to provide an early indication of potential corrosion problems. The coupon portion 6 can be coated to match the coating on the equipment being monitored. For example, if the equipment being monitored is galvanized, the coupon portion 106 can be galvanized.

At least one coupon portion 6 has a different thickness or diameter than the other coupon portions 6. In some embodiments, each of the coupon portions 6a-6d has a different thickness or diameter than the other coupon portions 6. The shape or geometry of the coupon portion 6 is not limiting so long as the measured level and/or rate of corrosion can be correlated to the level and/or rate of corrosion of the equipment being monitored with respect to the pertinent parameter such as, e.g., the thickness of a pipe wall. For example, where the continuity of the coupon 6 is being monitored, such as whether the coupon 6 open circuited or not, the shape or geometry of the coupon 6 should be such that the coupon portion 6 loses continuity (e.g., opens) prior to the equipment being monitored reaching an unsatisfactory state. For example, the coupon can lose continuity (open) prior to the walls of a pipe thinning to a point where failure has occurred or is imminent. The coupon portion 6 can have a uniform shape with respect to the exposed surface area, e.g., a uniform thickness with respect to the exposed surface area. A geometric shape of the coupon portion 6 can include a portion having a constant diameter (uniform thickness) such as, e.g., a cylindrical shape. The orientation of the coupon portion 6 can be such that the entire surface area of the coupon portion 6 is exposed to the corrosive environment. For example, if there is not enough of a gap between the coupon portion 6 and the top surface of the plug 3 and/or if there is not enough gap between a coupon portion 6 and another component (e.g., another coupon portion, wall of the sensor assembly, or another component), as the metal from coupon portion 6 corrodes and migrates, a buildup of the corroded material can potentially block (either partially or entirely) the coupon portion 6 from the corrosive environment. When this occurs, the coupon portion 6 can give false readings with respect to the monitored electrical characteristic. For example, the continuity can indicate closed when the coupon portion 6 is actually open. The coupon portion 6 can be disposed or oriented such that the entire surface area of the coupon portion 6 remains exposed to the corrosive environment for the life of the coupon portion 6.

Coupon portion 6 is not limited to a specific diameter or thickness. Generally, a smaller diameter/thickness coupon is used when a faster corrosion reading is desired. The coupon portion 6 can have a diameter or thickness that is in a range from about 0.003 inches to 0.050 inches. At least one coupon portion 6 can have a surface area that is different from the surface areas of the other coupon portions 6. In some embodiments, each coupon portion has a surface area that is different from the other coupon portions. A difference in the diameter or thickness of a given coupon portion 6 and a diameter or thickness of the next larger coupon portion 6 can be in a range from about 0.002 inch to about 0.035 inch. When four coupon portions 6a-6d are used, the diameters or thickness can be within ±10% of 0.014 inch, 0.018 inch, 0.0347 inch, and 0.047 inch, respectively. The diameters and thickness can depend on the equipment being monitored, the required or preferred resolution on the level/rate of corrosion, the preferred notice time for the corrosion, or some other criteria. For example, because a percentage change in the resistance of a thinner coupon portion 6 will be greater than a thicker coupon portion 6, if a user requires a higher resolution and/or an early alarm (early notice time) on the onset of any measurable corrosion, at least one of the coupon portions 6 may be configured to be much thinner than the rest.

If a coupon portion 6 having the smallest thickness or diameter has corroded to a point where the corresponding wire loop 5 open circuits (e.g., breaks), the other wire loops 5 can still be closed to provide an indication of the level and/or rate of corrosion of the equipment being monitored going forward. Accordingly, by providing coupon portions 6 with different thicknesses or diameters, the control circuit connected to the sensor assembly 2 (e.g., control circuit 104 discussed further below) can monitor the corrosion of the equipment, e.g., the wall of pipe 150, over an extended period of time. That is, when one coupon portion 6 breaks, a corrosion level and/or rate can be calculated. Because their thicknesses or diameters are larger, the other coupon portions 6 can remain intact, and thus there is no need to immediately replace the sensor assembly 2. The thickest coupon portion 6 can be sized such that the sensor assembly 2 need not be replaced for 10 to 15 years. This can be advantageous for monitoring the piping in fire systems, which typically last 50 to 100 years. By appropriately configuring the number and thicknesses/diameters of the coupons, the number of times a sensor assembly needs to be replaced can be minimized. In some embodiments, the coupon portions 6a-6d are sized such that the lifetime of the sensor assembly 2 is approximately the same as or longer than the lifetime of the equipment being monitored.

In some embodiments, the use of coupon portions 6 with different thicknesses or diameters allows for the rate of corrosion to be precisely tracked throughout the entire time period that the equipment is being monitored. For example, the coupon portions 6 can be configured such that, as the thinnest of coupon portions 6 open circuits due to corrosion or has reached a point where the change in resistance of the coupon portion cannot be accurately correlated to the level and/or rate of corrosion of the equipment, the next thinnest of coupon portions 6 reaches a thickness or diameter where the accuracy of the change in resistance readings is equal to or substantially equal to the original thickness or diameter of the coupon portion that just open circuited. This process can continue for the remaining coupon portions 6. That is, the thickness or diameter of the next thinnest remaining coupon portion 6 can be the same or substantially the same as (e.g., within ±25%) the original thickness or diameter of the thinnest coupon portion 6. In this way, the control circuit monitoring the sensor assembly 2 can accurately track the level and/or rate of corrosion of the equipment being monitored over an extended period of time when compared to having just one wire loop 5 that is initially very thick. By accurately monitoring the corrosion rate over an extended period of time, any change in the level and/or rate of corrosion can also be detected and brought to a user's attention, if necessary, as the coupon portions 6 corrode away.

FIGS. 5A-5D depict a sensor assembly including wire loops 5' and temperature sensor 20'. In the embodiment of FIGS. 5A-5D, the plug insert 3' is made of multiple components, e.g., cap 3A', insert body 3B', and connection end 3C', that are assembled together to form the plug insert 3'. Wire loops 5' can include a coupon portion 6' and a connection portion 11'. For example, the wire loops 5a'-5d' can include respective coupon portions 6a'-6d' and connection portions 11a'-11d'. The connection portions 11a'-11d' electrically connect coupon portions 6a'-6d' to a control circuit (e.g., control unit 104 discussed further below) that monitors an electrical characteristic of the coupon portions 6a'-6d'. In some embodiments, the coupon portions 6a'-6d' can connect directly to the control unit, such that there is no separate connector such as connectors 11a'-11d'. The connection portions 11a'-11d' can be not exposed to the corrosive environment, e.g., the interior of the pipe, so that the connection portions 11a'-11d' do not corrode. The connection portions 11a'-11d' can be made of a material that does not corrode as fast as the coupon portions 6a'-6d'. For example, the connection portions 11a'-11d' can be gold plated to ensure that the coupon portions 6a'-6d' corrode well before the connection portions 11a'-11d'. The resistance of the connection portions 11a'-11d' may not significantly change as the coupon portions 6a'-6d' corrode. In some embodiments, the connection portions 11a'-11d' are spring-loaded pogo pin-type connectors. The springs can account for any movement of the coupon portions 6a'-6d' due to corrosion of the coupon portions 6a'-6d'.

Figure 6:
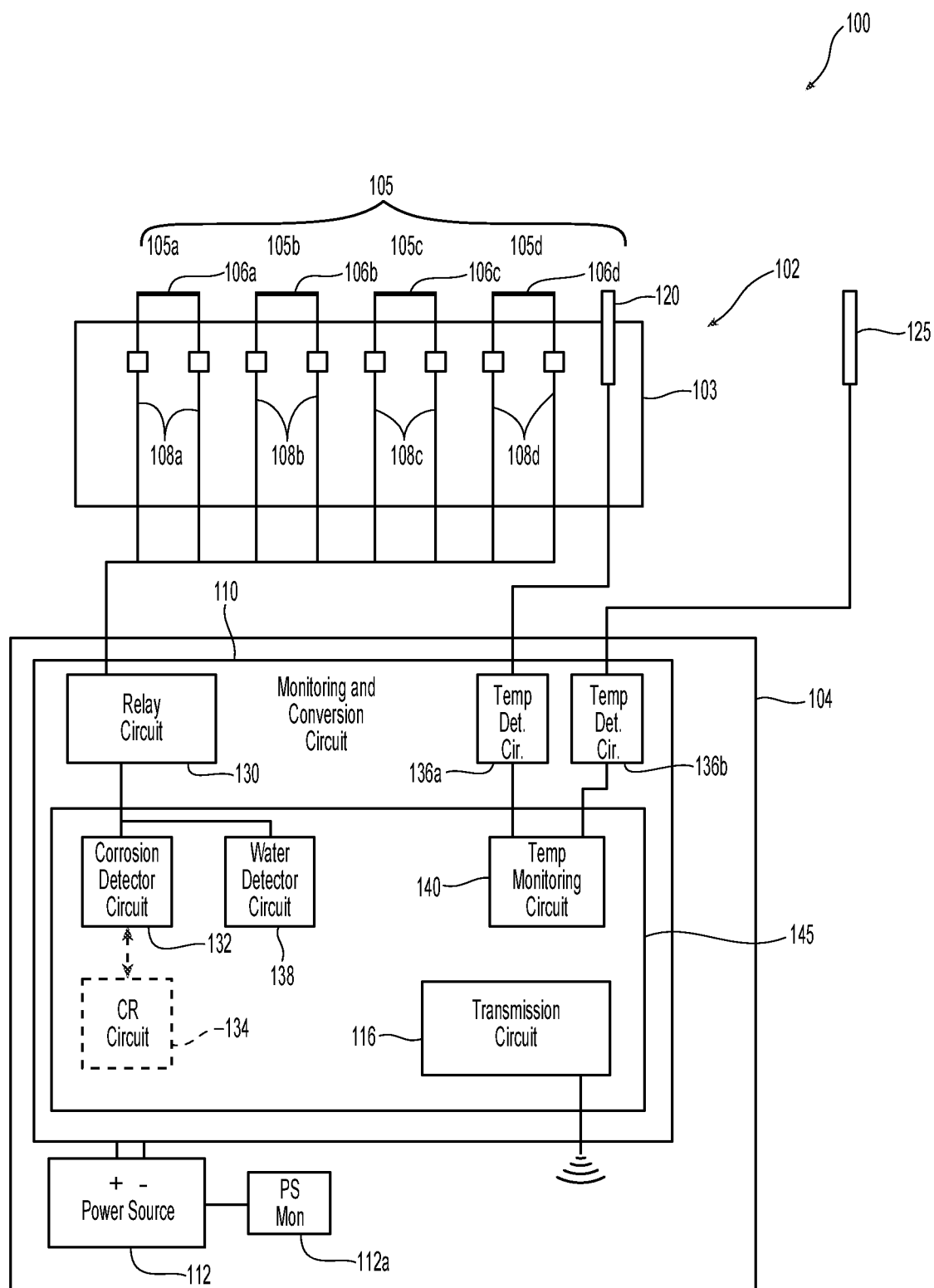
FIG. 6 is a block schematic view of a monitoring device.

FIG. 6 depicts a schematic block diagram of a monitoring device 100. The monitoring device 100 can include a sensor assembly 102 with corrosion sensors and/or temperature sensors and a control unit 104 that monitors the sensor assembly 102. The sensor assembly 102 can incorporate features of e.g., sensor assembly 2 or sensor assembly 2' discussed above. As depicted in FIG. 6, the control unit 104 can include a monitoring and conversion circuit 110. The corrosion sensors in sensor assembly 102 can be coupon portions 106 that corrode at a rate that can be correlated to a rate of corrosion of the monitored equipment. The monitoring and conversion circuit 110 can monitor an electrical characteristic of the coupon portion 106. Wire loop 105 can be, e.g., wire loop 5 or wire loop 5' discussed above, and coupon portions 106 can be coupon portions 6 or coupon portions 6' discussed above. In some embodiments, a change in the electrical characteristic is also determined from a previously determined electrical characteristic. The change in the electrical characteristic can be a change in the actual value of the monitored electrical characteristic and/or a percentage change in the value of the monitored electrical characteristic.

Figure 7:
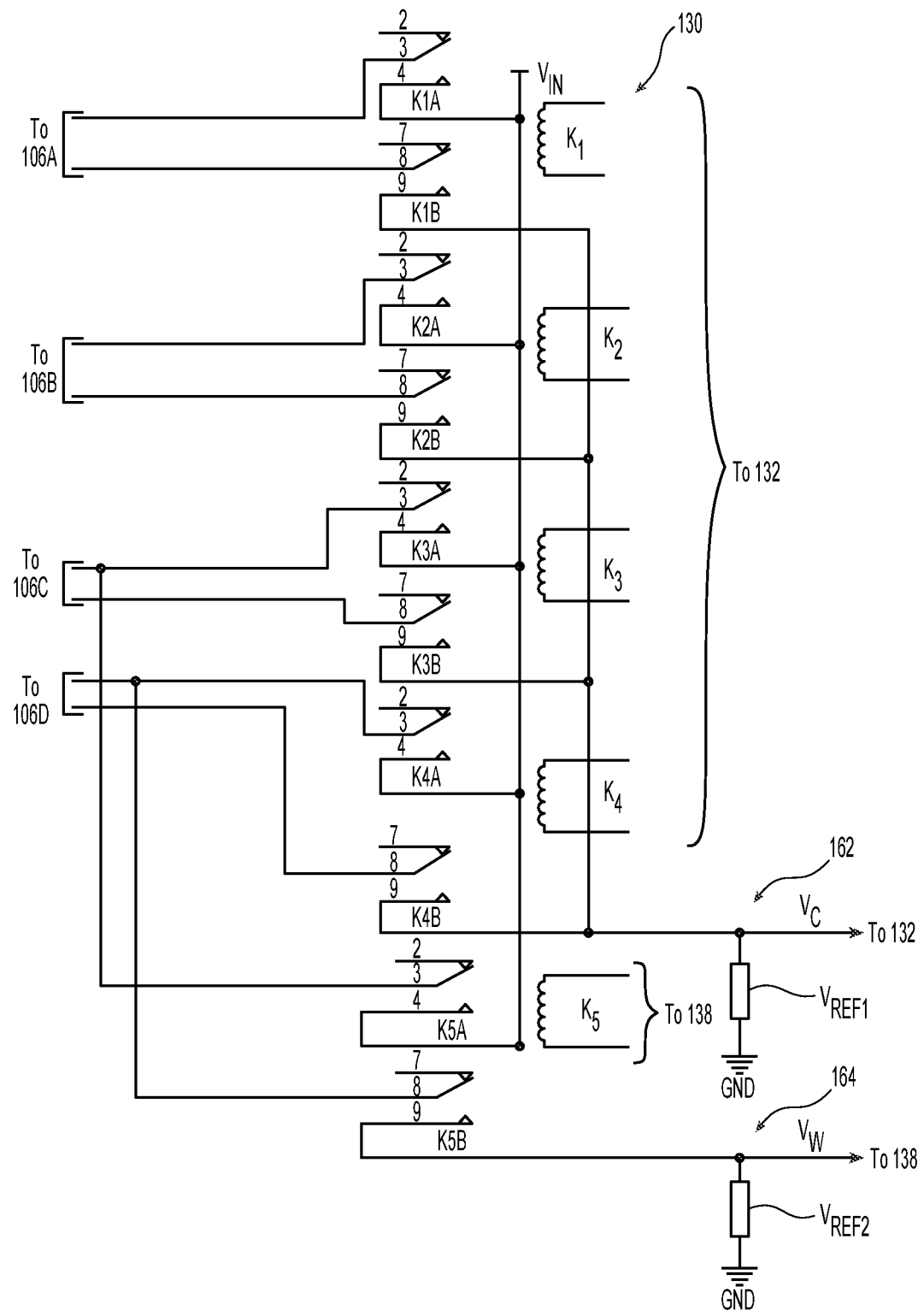
FIG. 7 is a schematic view of an exemplary relay circuit of a monitoring device.

The monitoring and conversion circuit 110 can provide currents that respectively flow through coupon portions 106A-106D of the respective wire loops 105A-105D. In some embodiments, the monitoring and conversation circuit 110 can include a corrosion detector circuit 132 to measure the electrical characteristic of the wire loop 105 and/or the coupon 106 and determine information related to at least one of the corrosion level and the rate of the equipment being monitored based on the measured electrical characteristic. The corrosion detector circuit 132 can determine the information related to the at least one of the corrosion level and the rate of equipment as a corrosion status. The electrical characteristic being monitored by the corrosion detector circuit 132 can be a voltage of the coupon portion 106 and the information being determined is whether coupon portion 106 and thus wire loop 105 has continuity or not, e.g., still forms a closed loop or has open circuited. For example, FIG. 7 depicts a relay circuit 130 that includes a voltage divider circuit 162 that can be used for determining a corrosion state of the coupon 106. The voltage divider circuit 162 includes relays K1-K4, a voltage source providing a voltage $V_{IN}$, and a reference resistor $R_{REF1}$ having a predetermined resistance. Reference resistor $R_{REF1}$ also serves as a pull-down resistor to keep the voltage $V_C$ from floating when the respective coupon portion 106 has corroded open and/or when relays K1-K4 are de-energized. Each relay K1-K4 can be operated, e.g., by a microprocessor (not shown) or other circuit, which can be part of the monitoring and conversation circuit 110. The microprocessor or other circuit can be part of the relay circuit 130. Each coupon portion 106a-106d can be respectively connected to the contacts corresponding to relays K1-K4. The coupon portions 106a-106d can be selectively connected. The coupon portions 106a-106d serve as the other "resistor" of the voltage divider circuit 162 when each relay K1-K4 is selectively operated. Based on the relay K1-K4 that is operated, a predetermined known voltage $V_{IN}$ is applied to one end of the corresponding coupon portion 106a-106d and a voltage $V_C$ can be read at the other end of the coupon portion 106a-106d. The voltage $V_C$ can be transmitted to and measured by the detector circuit 132. For example, when relay K1 is energized, a voltage $V_{IN}$ is applied to one end of coupon portion 106a via terminal K1-3 of relay contact K1A, and the voltage $V_C$ is read by corrosion detector circuit 132 via terminal K1-9 of relay contact K1B. Similarly, as relays K2-K4 are selectively energized, the corresponding voltage $V_C$ values for coupon portions 106b-106d are transmitted to and read by corrosion detector circuit 132. The voltage $V_C$ value measured by the corrosion detector circuit 132 is then read by the corrosion conversion circuit 134 to determine if the appropriate coupon portion 106 has open circuited due to corrosion or if there is still some continuity. The $V_{IN}$ value can be predetermined. In some embodiments, the value of $V_{IN}$ is stored in memory in the monitoring and conversion circuit 110 (or some other appropriate place) and accessible to the corrosion detector circuit 132 so that a separate measurement of $V_{IN}$ is not required. The $V_{IN}$ value can be measured by the corrosion detector circuit 132 when calculating the ratio $V_C/V_{IN}$. In some embodiments, the stored value of $V_{IN}$ can be updated either manually or automatically updated based on any variance in the $V_{IN}$ value, e.g., due to the output of power source 112 starting to drop. The corrosion detector circuit 132 can compare the ratio $V_C/V_{IN}$ to a predetermined value that corresponds to lack of continuity, i.e., an open circuit. In some embodiments, the value of $V_{IN}$ is the same as the voltage supplied to the relay circuit 130 and the analog to digital conversion circuit (ADC) in corrosion detector circuit 132. Because the same reference voltage is used for the ADC and the relay circuit 130, the measure voltage $V_C$ can be directly compared to a predetermined value that corresponds to lack of continuity, e.g., an open circuit.

For example, if the ratio is above the predetermined value, the corrosion detector circuit 132 determines that the corresponding coupon portion 106 has continuity, e.g., coupon portion 106 is not broken, and if the ratio is equal to or below the predetermined value, the corrosion detector circuit 132 determines that the corresponding coupon portion 106 is open, e.g., that the coupon portion 106 has corroded to a point that there is a complete physical break and the wire loop 105 has open circuited. In some embodiments, rather than a ratio, the measured voltage $V_C$ can be directed compared to a predetermined value. The predetermined value for determining whether there is an open circuit (whether for comparison with a ratio or directly to $V_C$) can be different based on whether the sensor assembly 102 is wet or dry. If wet (e.g., the sensor assembly 102 is in water), a current can still flow through the water to complete the current loop even after the coupon breaks, but $V_C$ will be lower due to the increased resistance of the current path through the water. If dry (e.g., the sensor assembly 102 is not in water), $V_C$ will be zero. Accordingly, the predetermined value can depend on whether the sensor assembly 102 is wet or dry. In some embodiments, the predetermined value is the same regardless of whether the sensor assembly 102 is wet or dry. The determination of whether coupon 106 has corroded open or not can be used in determining the level and/or rate of corrosion of the equipment being monitored. The determination of the level and/or rate of corrosion can be done in the monitoring and conversion circuit 110 and/or on a remote server or computer.

The corrosion detector circuit 132 can use various methods to determine whether the coupon 106 still has continuity or has corroded open. For example, a constant voltage drop can be provided across the respective coupon portions 106a-106d and a current through the coupon portions 106a-106d can be measured to determine whether there is an open circuit. When the coupon 106 breaks due to corrosion, the current through the respective wire loop 105 is lower or zero (depending on where the sensor assembly 102 is in water or not). Accordingly, in some embodiments, the measured current can be used to determine whether the coupon 106 has corroded open. For example, similar to the embodiment discussed above, a ratio of the measured current to a reference current (e.g., the current through an un-corroded coupon) can be compared to a predetermined value or the actual measured current can be compared to a predetermined value. A constant current can be transmitted (or attempted) through the respective coupon portions 106a-106d and a voltage drop across the wire loop 105a-105d and/or the respective coupon portion 106a-106d can be measured to determine whether the coupon portion 106 has corroded open. A ratio of the measured voltage to a reference voltage (e.g., the voltage across an un-corroded coupon) can be compared to a predetermined value or the actual measured voltage can be compared to a predetermined value; there will be a higher voltage drop across coupon 106 as compared to an un-corroded coupon 106 when the coupon 106 has corroded open.

In some embodiments, the measured voltage and/or current readings can be used to determine the actual corrosion level and/or rate prior to the coupon portion 106 corroding open. For example, a change in the voltage and/or current measurements can be correlated to a change in the corrosion of the coupon portion 106 (and thus the equipment being monitored) even before the coupon portion 106 has corroded open.

In some embodiments, the electrical characteristic can be a resistance value. For example, the voltage and/or current measurements discussed above can be used to determine a resistance value of the coupon 106, which can then be correlated to level and/or rate of corrosion of the equipment being monitored. For example, the corrosion detector circuit 132 can be configured to determine a resistance of the coupon 106. The corrosion detector circuit 132 can be configured to output a current through each of the wire loops 105A-105D. The corrosion detector circuit 132 can include a sensor to sense the current through at least one wire loop 105 (e.g., via known current sensors). The corrosion detector circuit 132 can provide a constant or near constant voltage drop across the coupon portions 106a-106d such that the respective current through each of the loops 105A-105D varies in time based on the amount of corrosion the respective coupon portions 106a-106d have experienced. For example, the coupon portions 106 are configured to corrode such that, as the coupon portions 106a-106d corrode, the current through each wire loop 105a-105d changes due to a decrease in the cross-sectional area of each coupon portion 106a-106d, which increases the resistance in the respective coupon portion 106a-106d. Based on the sensed value or values of each coupon portion 106a-106d, the corrosion detector circuit 132 (or another device such as monitoring platform 230—see FIG. 10) can calculate respective resistance values of the coupon portions 106a-106d, which can include instantaneous resistance values and/or averaged resistance values. In some embodiments, the corrosion detector circuit 132 can be configured to keep the current through each wire loop 105A-105D constant while sensing the voltage drop across each coupon portion 106a-106d. The measured voltage drop can then be correlated to a resistance value. The change in the resistance values can then be correlated to a level and/or rate of corrosion of the equipment being monitored.

The electrical characteristic can be an inductance value of the coupon 106. For example, the coupon 106 can be in the shape of a coil or some other shape that is appropriate for measuring inductance and the power to the coupon 106 can be an AC waveform (e.g., pulsed sinusoidal, etc.), a pulsed DC waveform, a stepped waveform, and/or another non-constant waveform. As the coupon 106 corrodes, its inductance will change, and the measured change in inductance is correlated to a level and/or rate of corrosion of the equipment being monitored. Various characteristics of the coupon portion 106 can be monitored so long as there is a correlation to the corrosion in the equipment.

Regardless of the type of electrical characteristic being measured or the sensing method being used (sensed voltage or sensed current), the $i^2r$ heating of the coupon portions 106a-106d may not adversely affect the calculations and/or is taken into account when determining the electrical characteristic of the coupon portions 106a-106d.

As depicted in FIG. 6, the monitoring and conversion circuit 110 can include a corrosion rate circuit 134 that receives the information related to the corrosion level and/or the rate of the equipment being monitored from the corrosion detector circuit 132. Based on the received information, the corrosion rate circuit 134 correlates the information regarding the electrical characteristic of the corrosion sensor 106 to a level of the corrosion (e.g., weight loss per area, loss of thickness of the metal, or some other measure of corrosion) and/or a rate of corrosion (e.g., mpy or mmy) of the equipment being monitored, e.g., the wall of pipe 150. For example, if the corrosion detector circuit 132 determines that a coupon portion 106 has opened, e.g., the continuity of the coupon portion has changed from having continuity to open (no continuity), the corrosion detector circuit 132 sends information to the corrosion rate circuit 134 that the appropriate coupon portion 106 has an open circuit status. The corrosion rate circuit 134 receives the status information from the corrosion detector circuit 132 and calculates the corrosion weight loss for the appropriate coupon portion 106. As an example, for a coupon portion having a 0.014 inch diameter, a density of 7.85 grams/cm$^3$, and an exposed area of 0.012 square inches, when the status of that coupon portion shows an open circuit, the corrosion rate circuit 134 will determine that the weight loss of the coupon portion is 0.005 grams. For each coupon size, the weight loss at the time that the coupon portion 106 has an open status can be determined empirically. The corrosion rate circuit 134 can correlate the weight loss per area of the coupon portion 106 to the weight loss per area of the equipment being monitored, e.g., the weight loss per area of the wall of pipe 150. These correlations can be determined empirically (e.g., the correlation between change in the electrical characteristic to the estimated loss of weight per area of the coupon portion and the correlation between the estimated loss of weight per area of the coupon portion and the estimated loss of weight per area of the equipment can be determined empirically). When the coupon portion 106 is made of the same material as the equipment being monitored, the weight loss per area of the coupon portion 106 will be the same (e.g., within ±25%) of the weight loss per area of the equipment being monitored, e.g., the wall of pipe 150. Based on the calculated weight loss per area (either of the coupon portion 106 or the equipment being monitored), in some embodiments, the corrosion rate circuit 134 can calculate the corrosion rate (CR) in, e.g., mils per year (mpy) or another measure. Based on the appropriate weight loss value (coupon or equipment) determined above, the corrosion rate (CR) of either the coupon portion 106 or the equipment being monitored can be calculated using the equation: $CR=(WL*K)/(D*A*ET)$; where WL is weight loss (e.g., grams); D is alloy density (e.g., $g/cm^3$); A is exposed area (e.g., $in^2$, $cm^2$); ET is exposure time (e.g., hours); and K is $5.34*10^5$ for calculating mpy when A is $in^2$, $3.45*10^6$ for calculating mpy when A is $cm^2$, and $8.76*10^4$ for calculating mmy when A is $cm^2$. The exposure time ET can be based on a start time stamp corresponding to when the sensor assembly 102 is installed and an end time stamp corresponding to when the corrosion detector circuit 132 measured the electrical characteristic. The corrosion rate circuit 134 can categorize the severity of the corrosion based on the calculated corrosion rate. For example, the corrosion rate circuit 134 can categorize a CR value in arrange from 0 to 3 mpy as "NORMAL CORROSION RATE," a CR value in a range from above 3 to 5 mpy as an "INTERMEDIATE CORROSION RATE," and a CR value in a range from above 5 mpy as an "ACCELERATED CORROSION RATE." Various numbers of categories can be used to classify the severity and various range values can be used for each category.

In some embodiments, the monitoring and conversion circuit 110 does not include corrosion rate circuit 134 and the corrosion level and corrosion rate calculations discussed above are performed by another device such as, e.g., monitoring platform 230. The other device, e.g., monitoring platform 230, can be implemented using a cloud networking system and includes a computational engine to perform the corrosion level and corrosion rate calculations discussed above. In such cases, the measured electrical characteristic and/or a change in the measured electrical characteristic (or information related to the electrical characteristic) can be transmitted by control unit 104 to the other device for processing. Whether performed by monitoring and conversion circuit 110 or an external device (e.g., monitoring platform 230), the information related to electrical characteristic values, changes in the electrical characteristic values, corrosion level, and/or corrosion rate can be transmitted to a user. The user can receive an indication of the severity of the corrosion rate in text format (e.g., NORMAL, INTERMEDIATE, ACCELERATED), as the actual value (e.g., in mpy or mmy), as a color indication (e.g., green for normal, yellow for intermediate, and red for accelerated) and/or using some other indication.

In some embodiments, the weight loss is calculated based on a change in an electrical characteristic other than continuity. For example, when resistance of each coupon portion 106 is being monitored, the corrosion rate circuit 134 correlates the change in resistance values to a loss of weight (e.g., in grams) per area of the respective coupon portions 106. In some embodiments, when more than one wire loop 105 is used, the loss of weight can be averaged over the number of wire loops 105. For example, the calculated change in resistance readings of the wire loops 105 can be averaged. The corrosion rate circuit 134 can correlate the loss of weight per area of the coupon portion 106 to an estimated loss of weight per area of the equipment being monitored, e.g., the loss of weight per area of the wall of pipe 150. The correlations cam be determined empirically (e.g., the correlation between change in resistance values to the estimated loss of weight per area of the coupon and the correlation between the estimated loss of weight per area of the coupon and the estimated loss of weight per area of the equipment). Similarly, a change in a voltage measurement of the coupon portion 106, a current measurement through coupon portion 106, and/or an inductance measurement of coupon portion 106 can be correlated to loss of weight per area of the coupon portion 106, which can then be used to calculate the loss of weight per area of the equipment being monitored.

When more than one wire loop 106 is used, the level/rate of corrosion calculated using the change in electrical characteristic of one coupon portion 106 can be compared to the level/rate of corrosion calculated using the other coupon portions 106, as a means to verify the accuracy of the level of corrosion and/or the rate of corrosion. For example, the continuity of the thinnest coupon portion 106 is compared to the continuity results of the other coupon portions for inconsistencies. As an example, if the open circuit pattern deviates from the thinnest coupon opening first to the thickest coupon opening last, an alert can be initiated indicating that the corrosion readings may be unreliable. That is, if a coupon portion 106 indicates that it is open but a thinner coupon portion 106 still indicates continuity, the monitoring and conversion circuit 110 (or another device) can be configured to initiate an alert that the readings from sensor assembly 102 are unreliable. The monitoring device 100 can not use electrical characteristic readings (e.g., voltage, current, resistance, inductance, etc.) that are bad and/or are suspect when calculating the change in the electrical characteristic for the coupon portions 106. For example, if the level/rate of corrosion calculated from monitoring coupon portion 106a is different from the level/rate of corrosion calculated from monitoring coupon portions 106b-106d by a predetermined amount, the monitoring device 100 can be configured to ignore (e.g., not use) the electrical characteristic readings from coupon portion 106a and keep monitoring the other coupon portions, e.g., coupon portions 106b-106d in this case. The corrosion level and/or the corrosion rate can be determined in real time based on the current and historical electrical characteristic readings.

As depicted in FIG. 6, the monitoring device 100 can include a temperature sensor 120. The temperature sensor 120 can be disposed in sensor assembly 102 and senses the temperature of the corrosive environment. For example, the temperature sensor 120 can sense the temperature of the inside of pipe 150. The monitoring and conversion circuit 110 can include a temperature detector circuit 136a that receives the signal from temperature sensor 120 and converts the sensor signal to a temperature value. The temperature sensor 120 can be, e.g., a thermocouple, RTD, a thermistor (NTC or PTC), or some other type of temperature sensing device. In some embodiments, the temperature sensor 120 is a 10K NTC thermistor. The temperature value from sensor 120 can be read by appropriate circuitry in monitoring and conversion circuit 110 or another device (e.g., monitoring platform 230) to predict potential problems due to the temperature, e.g., problems such as whether and when any water in the equipment (e.g., pipe 150) will freeze.

Figure 8:
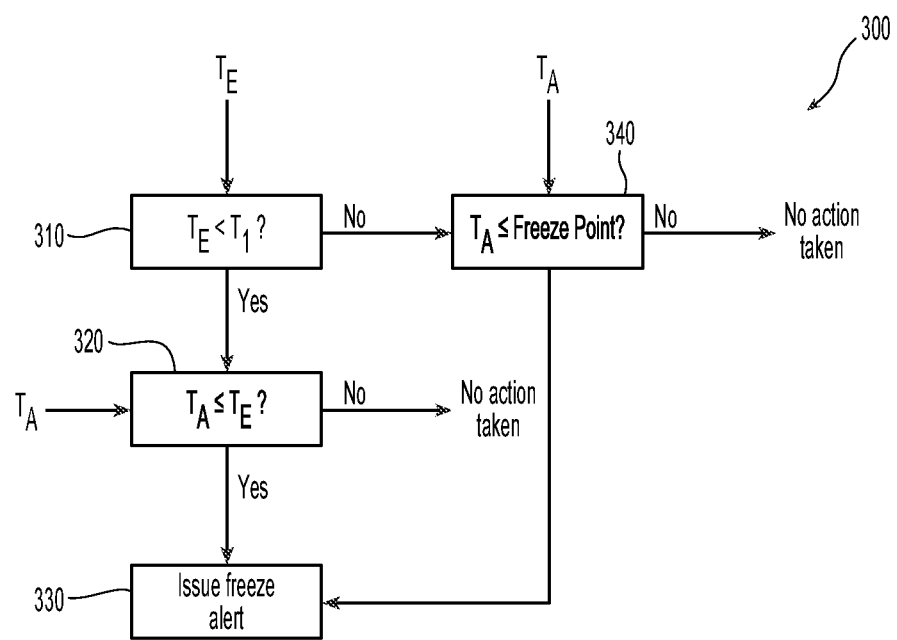
FIG. 8 is a flow diagram of a method of determining when a freeze alert should be issued to be executed by a temperature monitoring circuit of a monitoring device.

In some embodiments, a second temperature sensor 125 senses the ambient temperature outside the equipment being monitored for corrosion. For example, the temperature sensor 125 can sense the temperature of the ambient air surrounding the pipe 150. The temperature sensor 125 can be disposed in control unit 104, such as in the monitoring and conversion circuit 110. The temperature sensor 125 can be disposed outside the monitoring device 100. The temperature detector circuit 136*b* receives the signal from temperature sensor 125 and converts the sensor signal to a temperature value. In some embodiments, similar to the temperature sensor 120, the second temperature sensor 125 is also disposed in the monitoring device 100 but is arranged such that, while the temperature sensor 120 senses the temperature of the corrosive environment, e.g., inside the pipe 150, the second temperature sensor 125 senses the ambient temperature, e.g. outside the pipe 150. The temperature sensor 125 can be, e.g., a thermocouple, RTD, a thermistor (NTC or PTC), or some other type of temperature sensing device. In some embodiments, the temperature sensor 125 is a 10K NTC thermistor. By sensing both the temperature of the environment of the equipment being monitored and the ambient temperature (e.g., the temperature inside and outside the pipe 150), the two temperatures can be read and compared by appropriate circuitry in monitoring and conversion circuit 110 or another device (e.g., monitoring platform 230) to predict potential problems in the equipment due to the temperature, e.g., whether and when any water will freeze. For example, the monitoring and conversion circuit 110 or another device (e.g., monitoring platform 230) can predict whether there will be a failure of pipe 150 based on the temperature readings inside and/or outside the pipe 150. For example, as depicted in the flow diagram 300 in FIG. 8, in step 310, the temperature monitoring circuit 140 determines if the received equipment temperature ($T_E$) (e.g., temperature inside pipe 150) measured by temperature sensor 120 is below a predetermined temperature value $T_1$. If yes at step 310, the temperature monitoring circuit 140 determines if the received ambient temperature ($T_A$) from temperature sensor 125 is at or below $T_E$ at step 320. If yes at step 320, a freeze alert is issued by the temperature monitoring circuit 140 at step 330. The freeze alert can include a timestamp and the value of temperatures $T_E$ and $T_A$. The predetermined temperature value $T_1$ can be in a range from 30 deg. F. to 40 deg. F. The predetermined temperature value $T_1$ can depend on factors such as, e.g., the freezing point of the liquid in the equipment and the altitude of the equipment. A temperature value selected from near the lower range (e.g., at or below freezing such as 30 deg. F.) will provide a more reliable freeze alert but the time period to take action before the equipment freezes can be very short. A temperature value selected from near the upper range (e.g., well above freezing such as 40 deg. F.) will provide more time to take action but the freeze alert may not be as reliable as a lower value for $T_1$. If no at step 320, no action is taken by the temperature monitoring circuit 140.

If no at step 310, e.g., $T_E$ is above the predetermined temperature value, the temperature monitoring circuit 140 determines if the received temperature $T_A$ is at or below the freezing point for the liquid in the equipment being monitored, e.g., 32 deg. F., at step 340. If yes at step 340, a freeze alert is issued by the temperature monitoring circuit 140 at step 330. The freeze alert can include a timestamp and the value of temperatures $T_E$ and $T_A$. If no a step 340, no action is taken by the temperature monitoring circuit 140. When issued, the freeze alerts, timestamps, information related to the temperatures $T_E$ and $T_A$, including the temperature values and potential problems, can be transmitted to a remote user, e.g., a user using mobile device 210 and/or stationary electronic device 215. In some embodiments, the performance of the steps in flow diagram 300 can be done in another device (e.g., monitoring platform 230) or shared between the monitoring and conversion circuit 110 and another device (e.g., monitoring platform 230). For example, one or more steps 310 to 340 can be performed by the monitoring and conversion circuit 110 and any remaining steps can be performed by the other device (e.g., monitoring platform 230). For example, monitoring platform 230 can perform the step 330 and issue the freeze alert to the user. The temperature monitoring circuit 140 can collect temperature data for the equipment temperature ($T_E$) measured by temperature sensor 120 and the ambient temperature ($T_A$) from temperature sensor 125 and the other device, e.g., monitoring platform 230, resides on a cloud networking system and includes a computational engine to perform the freeze alert calculations and transmittals to the user.

Figure 9A:
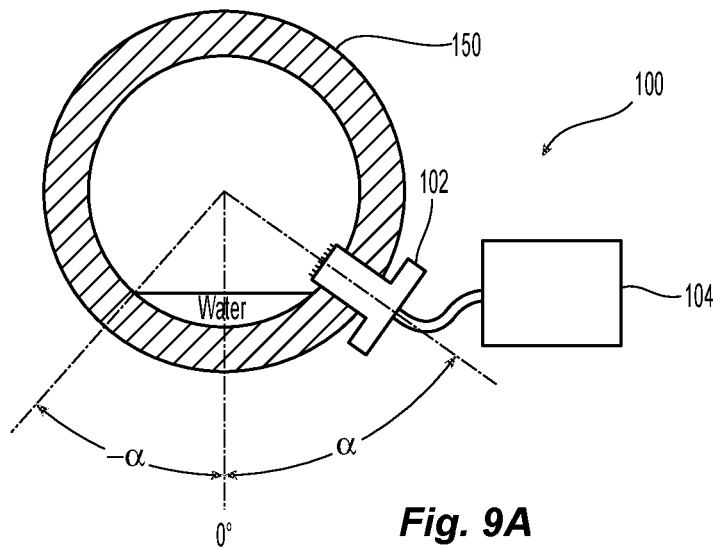
FIGS. 9A and 9B are arrangements of a monitoring device in "dry-pipe" and "wet-pipe" systems, respectively.
Figure 9B:
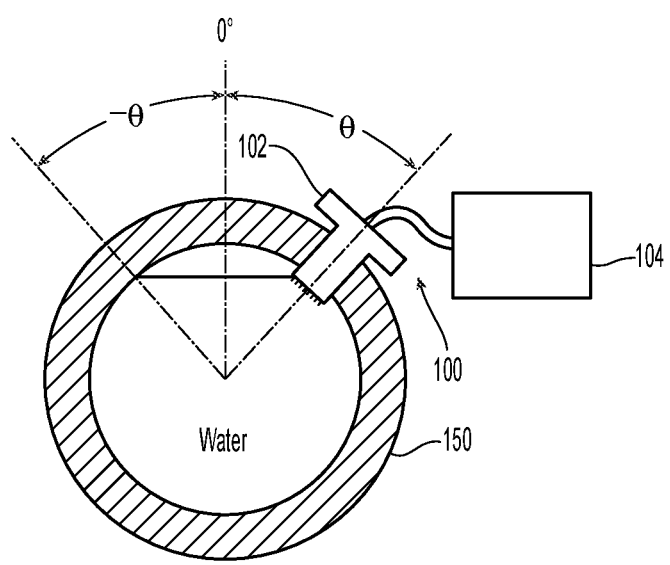

In some embodiments, the monitoring device 100 includes a water detection circuit 138 to sense the presence or absence of water in the equipment being monitored, e.g., in pipe 150. The water detection circuit 138 can use information derived from two of the coupon portions 106*a*-106*d* to detect the water. For example, the monitoring and water detection circuit 138 can sense a conductance between any two coupon portions 106 to determine whether there is water present between the coupon portions 106*a*-106*d*. When there are more than two coupon portions 106 in sensor assembly 102, voltage can be used to sense whether there is conductance between the two thickest coupon portions 106. For example, a voltage signal can be provided to one end of the second thickest coupon portion 106 and one end of the thickest coupon portion 106 is checked for the voltage signal. A voltage signal will exist if the sensor assembly 102 is in water. In this way, if the thinnest coupon portions 106 corrode away, the two thickest coupon portions 106 will still be able to detect for water. In some embodiments, the water detection circuit 138 includes a voltage divider circuit that includes a reference resistor having a predetermined resistance and the other "resistor" of the voltage divider circuit is the resistance of the current flow path between the two thickest coupons and the air and/or medium between them. For example, as depicted in FIG. 7, relay circuit 130 can include a voltage divider circuit 164 that can be used for determining the presence of water. The voltage divider circuit 164 includes relay K5, a voltage source providing voltage $V_{IN}$, and a reference resistor $R_{REF2}$ having a known resistance. Reference resistor $R_{REF2}$ also serves as a pull-down resistor to keep the voltage $V_W$ from floating when the respective coupon portion 106 has corroded open and/or when relay K5 is de-energized. The relay K5 can be operated, e.g., by a microprocessor (not shown) or other circuit, which can be part of the monitoring and conversion circuit 110. The microprocessor or other circuit can be part of the relay circuit 130. At least two of the coupon portions 106 can be connected to the voltage divider circuit in relay circuit 130 when K5 is operated. In the embodiment depicted in FIG. 7, coupon portions 106c and 106d, which can be the second thickest and thickest coupon portions, respectively, can be used for the detection of water. For example, when relay K5 is energized, a voltage $V_{IN}$ can be applied to one end of coupon portion 106c via terminal K5-3 of relay contact K5A. A voltage $V_W$ can be read at one end of the coupon 106d via terminal K5-9 of contact K5B. The voltage $V_W$, which corresponds to a resistance between the two coupons, can be transmitted to and measured by water detection circuit 138. The water detection circuit 138 and/or an external device (e.g., monitoring platform 230) reads and compares the voltage $V_W$ readings to a predetermined value that corresponds to a presence or absence of water in the sensor assembly 102, e.g., between coupon portions 106c and 106d. Where the monitoring device 100 is installed in a piping system, the presence of water in a "dry-pipe" system or the absence of water in a "wet-pipe" system can be an indication of a problem in the piping system. An alert can be sent to a user when there is an indication that a problem exists in the piping system. The alert can be sent with a timestamp. The same monitoring device 100 can be used for both "wet-pipe" and "dry-pipe" systems. The orientation of the sensor assembly 102 in the piping system can be based on the type of system. For example, as depicted in FIG. 9A, for "dry-pipe" system, the sensor assembly 102 can be located at the bottom half of the pipe, such as near the bottom. For example, the sensor assembly 102 can be disposed at an angle α in a range of ±60 degrees, such as ±45 degrees, and in some embodiments ±30 degrees, with zero degrees being the bottom of the pipe. For a dry-pipe system, the sensor assembly 2 can be mounted at an expected water-air boundary level that represents a water level at which a corrective action needs to be taken. For example, a small level of water in a dry-pipe system may not be a concern, but at some point the water level may reach a point where corrective action needs to be taken, e.g., checking for leaks in valves. For a "wet-pipe" system, as depicted in FIG. 9B, the sensor assembly 102 can be located at the top half of the pipe, such as near the top. For example, the sensor assembly 102 can be disposed at an angle θ in a range of ±60 degrees, such as ±45 degrees, and in some embodiments ±30 degrees, with zero degrees being the top of the pipe. The sensor assembly 2 can be mounted at an expected water-air boundary for the wet-pipe system and, in some embodiments, mounted sensing the water side of the water-air boundary. The sensor assembly 2 can be mounted onto a mechanical tee, an elbow tee, an endcap, or some other mounting assembly. The mounting can be adjustable so that the sensor assembly 2 can be moved relative to the pipe. For example, the sensor assembly 2 can be mounted onto a grooved mechanical tee or a grooved endcap so that the positon of the sensor assembly 2 can be adjusted relative to the pipe 150. An adjustable mounting allows for modifications to the mounting angle if system conditions change and/or the initial mounting angle was not correct, e.g., not correct with respect to the location of the water-air boundary.

If there are less than two coupon portions 106 that are good, the presence of water detection can be stopped until the sensor assembly 102 is replaced. However, if a coupon portion 106 has opened up, it can still be used for detecting the presence of water depending on how much of an open coupon portion 106 still exists. In this case a second coupon 106 is not needed to sense for water. For example, the water detection circuit 138 can use the open coupon portion to sense the conductance by transmitting a voltage signal at one end of the open coupon and checking for the voltage signal at the other end. A freeze alarm may be initiated only if water is detected and the temperature monitoring circuit 140 indicates that there is a chance the detected water can freeze. In this way, the freeze alarm can be not initiated when water is not detected to reduce nuisance alarms.

Figure 10:
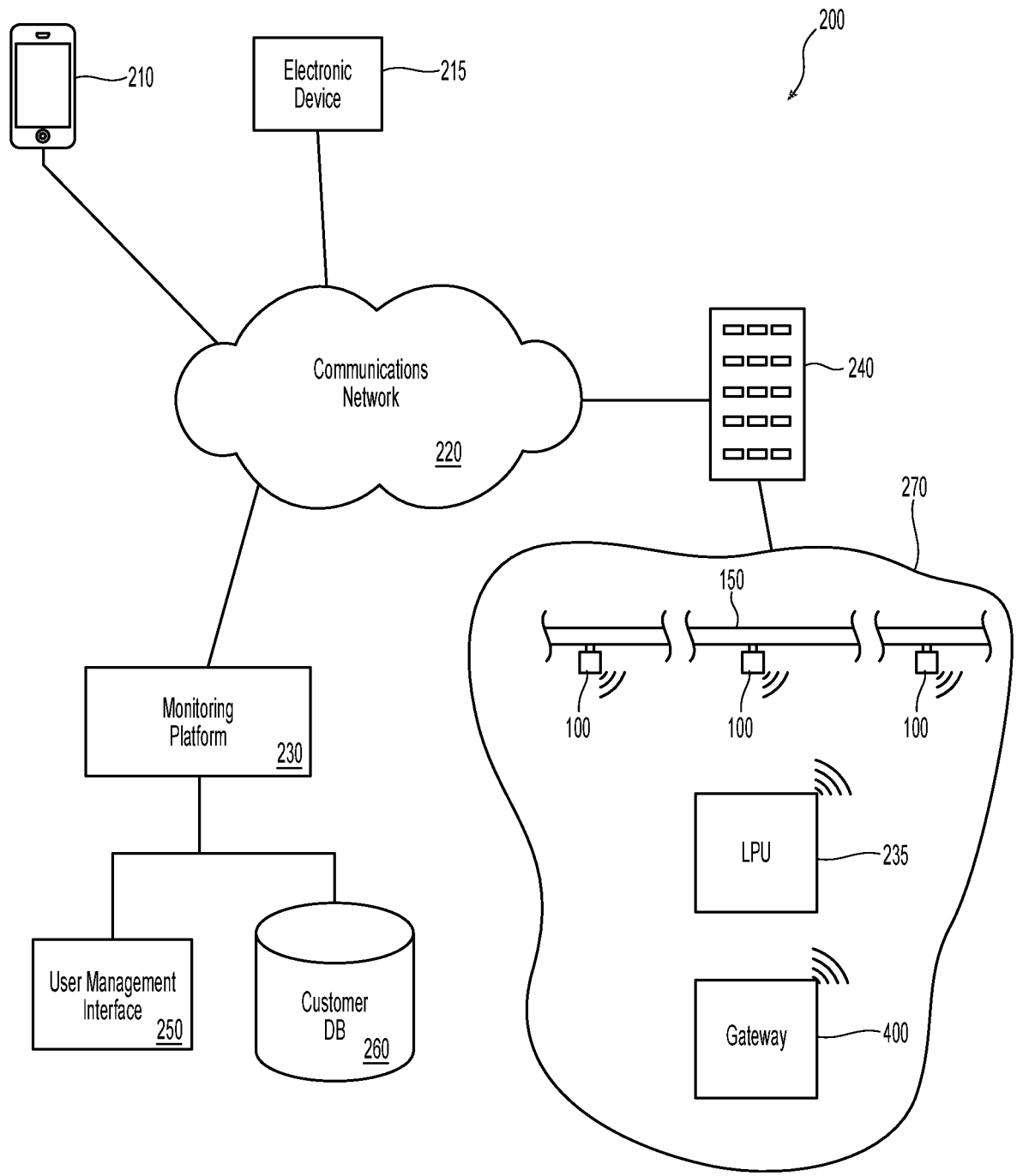
FIG. 10 is an example of an operating environment in which a monitoring device can be utilized.

As depicted in FIG. 6, the monitoring device 100 can include a transmission circuit 116 that includes a transmitter or transceiver for transmitting sensor values and/or information derived from the sensor values such as, for example, continuity readings, voltage readings, current readings, temperature readings (ambient and/or equipment environment), water freeze indications, inductance values, presence of water indication, resistance values, change in the resistance values, corrosion level values, corrosion rate values, timestamp values, and/or other sensor values and/or information to external devices (e.g., monitoring platform 230—see FIG. 10) via, e.g., communication network 220 (see FIG. 10). In addition to the various values and information discussed above, the transmission circuit 116 can also transmit other information generated by the monitoring device 100 such as the status of the monitoring device 100 (e.g., on-line, off-line, working properly, not working, needs repair, and/or some other status value), status of the individual voltage, current, inductance, and/or temperature sensors (e.g., working, not working, value out of range, and/or some other information concerning the sensors), status of the wire loops (e.g., closed or open (broken) loop, expected life, or some other information concerning the wire loops), and/or some other information related to the readiness of monitoring device 100.

The transmission circuit 116 can use wired and/or wireless networks to communicate the values and/or information to the external devices. The transmission circuit 116 can use a wireless network to communicate the values and/or information to the external devices. The wireless network can have a range of up to 3 miles. In some embodiments, the transmission circuit 116 can transmit the values and/or information to a gateway (discussed further below) using the wireless network, and the gateway transmits the values and/or information using a cellular or IP-based network to the external devices via communications network 220. The transmission circuit 116 can use a LoRaWAN wireless network via a MultiConnect® xDot™ made by MultiTech. In some embodiments, the transmission circuit 116 can be configured to transmit the values and/or information over a period of time in batches.

The control unit 104 can include a power source 112. The power source 112 provides power to the monitoring and conversion circuit 110. The power source 112 can be a battery, such as a battery that is "off-the-shelf." In some embodiments, the battery can be a lithium ion battery (or batteries), which provides a long battery life. The battery can last 6 to 10 years without the need for replacement. The power source 112 can be monitored by a power monitoring circuit 112a that provides an alert or alarm if there is a problem with the power source 112. For example, if the power source 112 is a battery, the power source monitoring circuit 112a can provide an alert/alarm when the battery is low and/or needs to be replaced. In some embodiments, the battery is a rechargeable battery while in other embodiments the battery is replaced after it is discharged. In case of a rechargeable battery, the power to charge the battery in power source 112 can be supplied by a DC or AC bus connected to a utility grid and/or supplied by solar cells. In some embodiments, the battery of power source 112 is not field replaceable or rechargeable. In this case, the battery can be configured to last the expected life of the pipe 150 and/or the monitoring device 100 can be shipped to a service center for battery replacement. In some embodiments, the power source 112 converts power from an external source such as, for example, the DC or AC power bus, which can be connected to a plurality of monitoring devices 100.

In some embodiments, the monitoring and conversion circuit 110 can include local memory (e.g., machine-readable medium) to record and store one or more of reference values (e.g., $V_{IN}$, $V_{REF1}$, $V_{REF2}$), the measured sensor values and/or electrical characteristic values (e.g., $V_C$, $V_W$, other voltage values, current values, inductance values, continuity values, and/or temperature values), the calculated electrical characteristic values (e.g., resistance), the calculated chance in electrical characteristic values, the calculated corrosion level/rate values, and/or other calculated and/or determined information. The monitoring and conversion circuit 110 can include look-up-tables, databases, equations, or some other data conversion method that includes information related to the correlations, as discussed above, between one or more of the following: resistance values, change in resistance values, coupon weight loss per area values, equipment weight loss per area values, and/or corrosion level/rate values. The monitoring and conversion circuit 110 can include look-up-tables, databases, equations, or some other data conversion method to make the correlation between the voltage values and the presence or absence of water determination, and to make the correlation between temperature values and the determination of potential problems for the equipment, e.g., a determination as to whether and when the water will freeze. An external device (e.g., monitoring platform 230—see FIG. 10) can include look-up-tables, databases, equations, or some other data conversion method to make the correlations as discussed above. The external device can also include memory (e.g., machine-readable medium) to record and store one or more of reference values (e.g., $V_{IN}$, $V_{REF1}$, $V_{REF2}$), the measured sensor values and/or electrical characteristic values (e.g., $V_C$, $V_W$, other voltage values, current values, inductance values, continuity values, and/or temperature values), the calculated electrical characteristic values (e.g., resistance), the calculated chance in electrical characteristic values, the calculated corrosion level/rate values, and/or other calculated and/or determined information.

The corrosion monitoring, temperature monitoring, water detection monitoring and/or transmitting functions discussed above can be incorporated in to a one or more programmable microprocessors. For example, as depicted in FIG. 6, a microprocessor 145 can be programmed to perform the functions of the corrosion detector circuit 132, the corrosion rate circuit 134, the temperature monitor circuit 140, the water detector circuit 138, and/or the transmitter circuit 116. The programmable microprocessor can be an Advanced RISC Machines (ARM) processor such as, e.g, a MultiConnect® xDot™ that communicates over a LoRaWAN network. The programmable processor 145 can receive the temperature feedback signals from temperature detector 120 and/or temperature detector 125. The programmable processor 145 can then perform the functions of temperature monitoring circuit 140 (e.g., determining freeze alerts) as discussed above. In some embodiments, the relays K1-K4 are connected to and operated by the programmable processor 145, and the programmable processor 145 is configured to read the voltage signals from the corresponding relay contacts as discussed above. The programmable processor 145 can then perform the functions of the corrosion detector circuit 132 and/or the corrosion rate circuit 134 as discussed above. The programmable processor 145 can be connected to relay K5 and be configured to read the voltage signals from the relay contact. The programmable processor 145 can then perform the functions of the water detector circuit 138 as discussed above.

In some embodiments, the monitoring device 100 can continuously measure the coupon voltage values and the temperature values and/or continuously transmit the measured values. Depending on the type of system and the environment that the equipment is installed in, corrosion of the equipment to any significant degree may not be detected for years. In addition, even when the corrosion is detected, the progression of the corrosion may occur over months or years. In such cases, a constant drain on the power source 112 by continuously sending current through the wire loops 105 can be undesirable and considered a waste of energy and/or inefficient. Similarly, continuously checking the temperature or the presence of water may not be worth the cost to battery life. For example, if the temperatures are above freezing and/or fairly constant, a once a day check may be sufficient to protect the equipment. Accordingly, in some embodiments, the microprocessor 145 or one or more of the individual circuits in the monitoring and conversion circuit 110 (e.g., the corrosion detector circuit 132, the corrosion rate circuit 134, the temperature monitoring circuit 140, and/or the water detector circuit 138 is programmed to only take readings for a predetermined duration of time. The predetermined duration of time can range from a few seconds to a few minutes depending on the number of measurements that are required. For example, each corrosion related, temperature related, and/or water detection related measurement can be taken a predetermined number of times. When more than one measurement is taken, the measurements can be averaged. In addition to limiting the duration of time that the readings are taken, the time period between when the microprocessor 145 or the appropriate circuit takes the corrosion related, temperature related, and/or water detection related measurement can be based on a predetermined time period (e.g., every predetermined number of minutes, days, weeks, months, and/or years). The predetermined time periods for the respective measurements can be set independently. For example, the corrosion related and water detection measurements can be performed once a day while the temperature related measurements can be performed every minute. The time period between when the measurements are taken can be based on one or more of the following performance criteria: required battery life, remaining battery life, the level of corrosion, the rate of corrosion, the temperature of the equipment environment, the ambient temperature, the presence or absence of water, and/or some other performance criteria. For example, if the monitoring device 100 is required to be installed for a period of, e.g., 10 years, the microprocessor 145 or the appropriate circuit can be configured to take into account this factor when determining when and/or how often to take the measurements. The microprocessor 145 or the appropriate circuit can be configured to take the battery life (e.g., high/low, number of years remaining) as another factor to take into consideration. The rate of corrosion and the level of corrosion are also factors that can be used to determine when and/or how often to take the measurements. For example, at initial installation, when the rate of corrosion and/or the level of corrosion is expected to be low, the microprocessor 145 or circuit 132 and/or 134 can be configured such that the time period between when corrosion related measurements are relatively long initially and then gradually or periodically shortened as the rate and/or level of corrosion increases. In situations where the corrosion rate or level is not a primary concern but the temperature is a primary concern due to, e.g., water freezing concerns, the microprocessor 145 or circuit 140 can use the equipment environment temperature from temperature sensor 120 and/or ambient temperature from temperature sensor 125 as factors in determining how often to power up the circuits. In some embodiments, to prevent electrical interactions, e.g., unintended current flow, that can accelerate or decelerate the corrosion of the coupon portions 106, the relay circuit 130 breaks the connection, e.g., by opening the contacts on the relays K1-K5, between the wire loops 105 and the relevant circuits in monitoring and conversion circuit 110.

Operation of the transmission circuit 116 can be regulated in order to conserve power. In some embodiments, the values and/or information transmitted to and measured by the microprocessor 145 (or individually from the corrosion detector circuit 132, the corrosion rate circuit 134, the temperature monitor circuit 140, and/or the water detector circuit 138) can be transmitted by the transmitter 116 as respective measurements are being made. In some embodiments, the time period for transmission of the measured values and/or information is independent of the time period that the measurements are made. For example, the transmission circuit 116 can transmit values and/or status information once each day or some other predetermined time period regardless of when or how often the measurements are made. The measured values and/or status information can be transmitted responsive to detecting a change in the measured values. In some embodiments, the measured values and/or status information are transmitted only when the value changes by a predetermined amount or the status information changes. For example, the temperature readings from temperature sensors 120 and 125 can be transmitted by transmitter circuit 116 when they change by a predetermined amount such as, e.g., 2 deg. F. Similarly, the continuity status (open/closed) of a coupon portion 106 and/or the water presence status can be transmitted responsive to detecting that the respective status has changed (a coupon has open circuited (broken) or has open circuited out of sequence (i.e., a larger coupon has broken before a smaller coupon in which case an error status is transmitted), or the water presence status shows a change from "wet" to "dry" or a change from "dry" to "wet").

FIG. 10 depicts an example of operating environment 200, which may include one or more mobile devices 210 (e.g., a mobile phone, tablet computer, mobile media device, mobile gaming device, vehicle-based computer, wearable computing device, portable computer, or other portable communication device), stationary electronic device 215 (e.g., desktop computers, servers, mainframes, or another type of non-portable electronic device), communications network 220, monitoring platform 230 (e.g., running on one or more remote servers or mainframes), monitoring system 270 (including one or more monitoring devices 100, local processing unit 235, and/or gateway unit 400) located in a building 240, user management interface 250, and a customer database 260. In some embodiments, the end user can monitor, e.g., by means of an app on the mobile device 210 and/or the stationary electronic device 215, the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water by means of an app on the mobile device 210 and/or electronic device 215. Information such as sensor values, the status of the monitoring system 270 (e.g., on-line, off-line, working properly, not working, needs repair, and/or some other status value), status of the individual voltage, current, inductance, continuity, and/or temperature sensors (e.g., working, not working, value out of range, and/or some other information concerning the sensors), status of the corrosion sensors (e.g., closed or open (broken), expected life, or some other information concerning the corrosion sensors), and/or some other information related to the readiness of corrosion monitoring system 270 can be transmitted to the mobile device 210 and/or electronic device 215. The mobile device 210 and/or electronic device 215 can provide alerts, predicted maintenance times, predicted failures, or other information that shows the status of the equipment being monitored, e.g., a piping system, and/or the monitoring system 270.

Mobile devices 210, stationary electronic device 215 and the monitoring system 270 can include network communication components that enable communication with remote hosting servers or mainframes (e.g., monitoring platform 230), other stationary computers and servers, or other portable electronic devices by transmitting and receiving wireless signals using licensed, semi-licensed or unlicensed spectrum over communications network 220. In some embodiments, communications network 220 may comprise multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 220 can also include third-party communications networks such as a LoRaWAN network, a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network. In some embodiments, communication network is a cloud-based network, such as a cloud-based backend server that includes the computational engines to calculate the corrosion, freeze alert, and/or water presence calculations discussed above.

Various components (not shown) may be included in mobile devices 210 to enable network communication. For example, a mobile device 210 may be configured to communicate over a GSM mobile telecommunications network. As a result, the mobile device 210 or components of the corrosion monitoring system 270 may include a Subscriber Identity Module (SIM) card that stores an International Mobile Subscriber Identity (IMSI) number that is used to identify the mobile device 210 on the GSM mobile communications network or other networks, for example, those employing 3G and/or 4G wireless protocols. If the mobile device 210, stationary electronic device 215 or monitoring system 270 is configured to communicate over another communications network, the mobile device 210, stationary electronic device 215 or components of the monitoring system 270 may include other components that enable it to be identified on the other communications networks.

In some embodiments, mobile devices 210, stationary electronic device 215 or components of the monitoring system 270 in building 240 may include components that enable them to connect to a communications network using Generic Access Network (GAN) or Unlicensed Mobile Access (UMA) standards and protocols. For example, a mobile device 210 and/or electronic device 215 may include components that support Internet Protocol (IP)-based communication over a Wireless Local Area Network (WLAN) and components that enable communication with the telecommunications network over the IP-based WLAN. Mobile devices 210, stationary electronic device 215 or components of the monitoring system 270 may include one or more mobile applications that need to transfer data or check-in with monitoring platform 230.

In some embodiments, monitoring platform 230 receives signals regarding the state of one or more monitoring systems 270. The signals can indicate the current status of a variety of system components. For example, the signals can include information related to the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water. Monitoring platform 230 can receive signals related to other information such as sensor values, the status of the monitoring system 270 (e.g., on-line, off-line, working properly, not working, needs repair, and/or some other status value), status of the individual voltage, current, inductance, continuity, and/or temperature sensors (e.g., working, not working, value out of range, and/or some other information concerning the sensors), status of the corrosion sensors (e.g., closed or open (broken) loop, expected life, or some other information concerning the corrosion sensors), and/or some other information related to the readiness of monitoring system 270. The monitoring platform 230 can provide alerts, predicted maintenance times, predicted failures, or other information that shows the status of the equipment being monitored, e.g., a piping system, and/or the monitoring system 270 in the building 240 to external devices such as, e.g., mobile device 210 and/or stationary electronic device 215. In some embodiments, the monitoring platform 230 is a cloud-based back-end server that includes the computational engines to calculate the corrosion, freeze alert, and/or water presence calculations discussed above.

Monitoring platform 230 can provide a centralized reporting platform for companies having multiple properties with monitoring systems 270. For example, a hotel chain or restaurant chain may desire to monitor piping systems in multiple properties via monitoring platform 230. This information can be stored in a database in one or more monitoring system profiles. Each of the monitoring system profiles can include a location of a monitoring system 270, a monitoring system identifier, a list of components of the monitoring system 270, a list of sensors available on the monitoring system 270, current and historical state information (including information related to the sensors, the level/rate of corrosion, the temperature of the water, presence or absence of water, and/or status of the monitoring system 270, etc.), contact information (e.g., phone numbers, mailing addresses, etc.), maintenance logs, and other information. By recording the maintenance logs, for example, monitoring platform 230 can create certifiable maintenance records to third parties (e.g., insurance companies, fire marshals, etc.) which can be stored in customer database 260.

The monitoring system 270 in building 240 can include a local processing unit 235 that communicates with one or more monitoring devices 100. Local processing unit 235 can be configured to receive the sensor values and/or other information, as discussed above, from one or more of the monitoring device 100 and transmit the sensor values and/or other information to monitoring platform 230 via, e.g., communications network 220. In some embodiments, local processing unit 235 can directly communicate the sensor values and/or other information from one or more monitoring devices 100 to monitoring platform 230. The monitoring system 270 in building 240 can include a gateway 400 that can communicate with one or more local processing units 235 and the local processing unit 235 can transmit the sensor values and/or other information from one or more monitoring devices 100 to the gateway unit 400. The monitoring system 270 in building 240 may not include a local processing unit 235, but includes a gateway 400 that can directly receive the sensor values and/or other information from the one or more monitoring devices 100 via the transmission circuit 116, e.g., via a LoRaWAN wireless network. The gateway unit 400, upon receiving the signal values, can then transmit (e.g., using a cellular or IP-based network) the sensor values and/or other information from one or more monitoring devices 100 to the monitoring platform 230 (or other device) via communications network 220. The monitoring platform 230 (or other device) can be a cloud-based server or device.

In some embodiments, the monitoring devices 100 can include local memory to record information over a period of time. Local processing unit 235 can transmit the information in batches to the monitoring platform 230. These transmissions may be prescheduled (e.g., every ten minutes, every hour, once a day, etc.), event triggered, and/or coordinate with respective monitoring devices 100. As an example, the system may send more frequent transmissions based on the type of piping system (wet or dry), based on the temperature of the equipment environment, the environment outside the pipe, the presence or absence of water, the corrosion level value, the corrosion rate value, and/or some other criteria. The information recorded by the monitoring device 100 can be, e.g., information related to the sensor values (e.g., voltage, current, temperature, inductance, continuity, or some other sensor value), information related to the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water, and/or information related to the status of the monitoring system 100, including status of sensors, (e.g., closed or open (broken) coupons, on-line, off-line, working properly, not working, needs repair, and/or some other status value).

Figure 11:
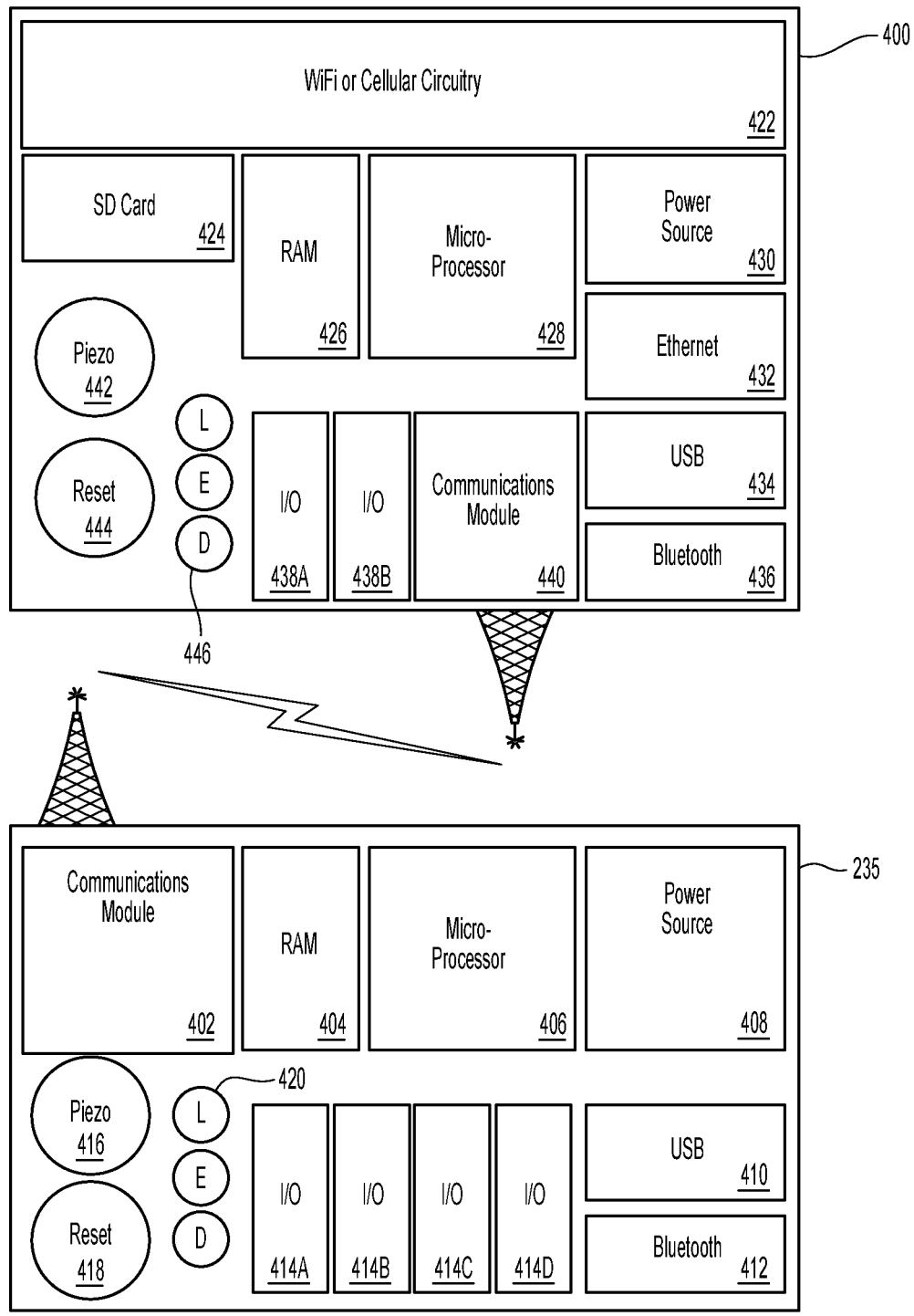
FIG. 11 is a block diagram of a processing circuit set associated with a corrosion monitoring system and a gateway unit capable of receiving transmissions from one or more processing circuits.

FIG. 11 depicts a local processing unit 235 associated with one or more monitoring devices 100 and a gateway unit 400 capable of receiving transmissions from one or more local processing units 235. Local processing unit 235 and gateway unit 400 can be low-power, microprocessor-based devices focused solely on a particular application. These units may include processing units, memories, I/O capabilities, audible and visual signaling devices, and external communications capabilities. For example, local processing unit 235 can include communications module 402, RAM 404, microprocessor 406, power source 408, USB 410, Bluetooth 412, I/O's 414A-414D, piezo 416 for providing a local audible alarm, reset 418 for resetting the alarm, and LEDs 420. Local processing unit 235 can communicate (e.g., wirelessly) with one or more monitoring devices 100 and other devices monitoring the piping system in building 240. The local processing unit 235 can directly receive the sensor values and/or other information from the one or more monitoring devices 100 via the transmission circuit 116, e.g., via a LoRaWAN wireless network. Gateway unit 400 can include Wi-Fi or cellular circuitry 422, SD card 424, RAM 426, microprocessor 428, power source 430, Ethernet 432, USB 434, Bluetooth 436, I/O's 438A-438B, communications module 440, piezo 442 for providing a local audible alarm, reset 444 for resetting the alarm, and/or LEDs 446. When gateway unit 400 includes cellular circuitry, in some embodiments, a SIM card that stores an IMSI number is used to identify the gateway unit 400 on a GSM mobile communications network or other networks, for example, those employing 3G and/or 4G wireless protocols.

Microprocessors 406 and 428 can have unique identifiers (IDs) programmed or set at the manufacturing level. The unique IDs can be used to link or associate local processing unit 235 and/or gateway unit 400 with customers, particular monitoring systems 270, physical sites, and/or other information. Owners and system service providers can be notified, e.g., via mobile device 210 and/or stationary electronic device 215, of the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), the presence or absence of water, sensor values, the status of the monitoring system 270, the status of a monitoring device 100, (e.g., on-line, off-line, working properly, not working, needs repair, and/or some other status value), status of the individual voltage, current, inductance, continuity, and/or temperature sensors (e.g., working, not working, value out of range, and/or some other information concerning the sensors), status of the corrosion sensors (e.g., closed or open (broken) loop, expected life, or some other information concerning the corrosion sensors), and/or some other information related to the readiness of corrosion monitoring system 270. Owners and system service providers can be notified, e.g., via mobile device 210 and/or stationary electronic device 215, of alerts, predicted maintenance times, predicted failures, or other information that shows the status of the equipment being monitored, e.g., a piping system, and/or the monitoring system 270. User profiles enable the end user to define his or her type or types of notification and when they occur (any time versus specific times). Accordingly, the notification capabilities are not solely limited to alarm or alert notifications. Since the system is capable of identifying maintenance activity and/or normal states, the system can be configured to notify end users, technicians and customers of the states.

I/Os 414A-414D can be simple contact closure with a mechanical option to connect a switch to the normally open or normally closed terminals. This can help accommodate a variety of system configurations and may result in less field programming. Audible and visual warnings can be local (within the vicinity of the monitored system). For example, visual indicators may be board-based LED's 420, and audible would be a buzzer or piezo 416. Dry or wet contacts may be used to provide binary alarm, warning, supervisory, trouble or other alerts to secondary fire, security, building automation or like systems on site.

Local processing unit 235 and/or gateway unit 400 can have a variety of external communications. In some embodiments, these components can support serial or USB communications so that the device can be programmed, configured or interrogated. A local Ethernet port 432 (supporting POE) may also be available in some embodiments. Additional communications options may include the ability to add a daughter board for Wi-Fi or Cellular connectivity. The local processing unit and/or gateway 400 can be configured to communicate over a LoRaWAN wireless network. This component can allow all data and events local to the system to a centralized server (e.g., monitoring platform 230).

Figure 12:
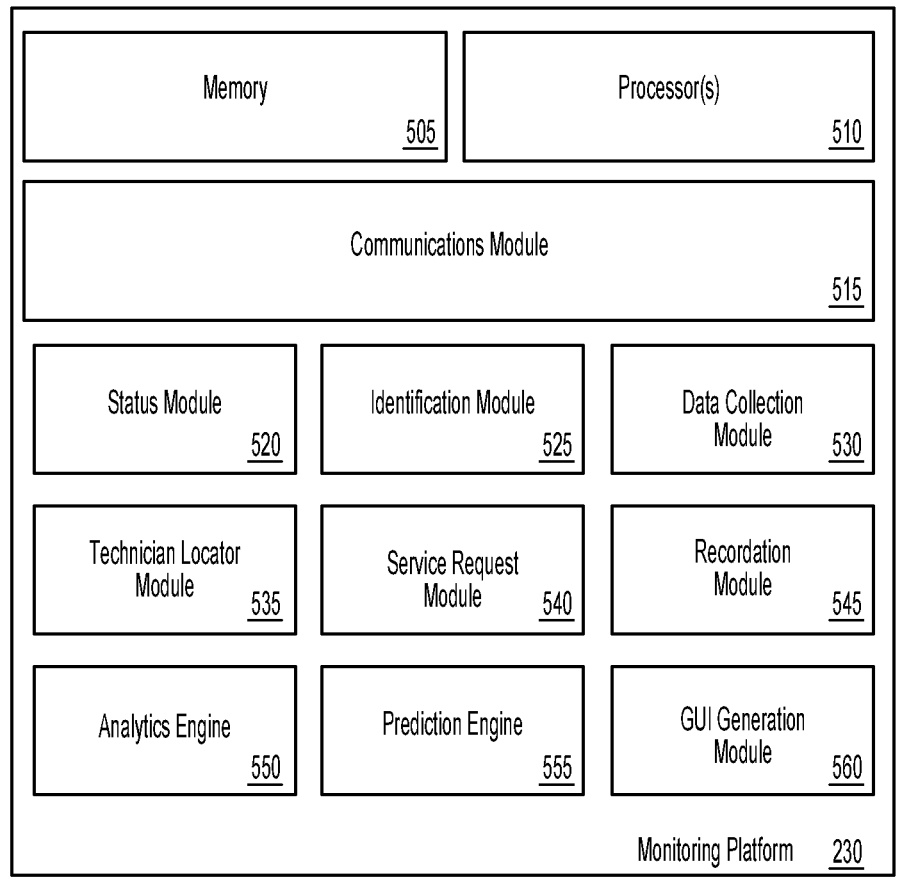
FIG. 12 is a block diagram of a monitoring platform.

FIG. 12 depicts components 500 within a monitoring platform 230. Monitoring platform 230 can include memory 505, one or more processors 510, communications module 515, status module 520, identification module 525, data collection module 530, technician locator module 535, service request module 540, recordation module 545, analytics engine 550, prediction engine 555, and graphical user interface (GUI) generation module 560. Each of these modules can be embodied as special-purpose hardware (e.g., one or more ARMs, ASICS, PLDs, FPGAs, or the like), or as programmable circuitry (e.g., one or more microprocessors, microcontrollers, or the like) appropriately programmed with software and/or firmware, or as a combination of special-purpose hardware and programmable circuitry. Various combinations of such modules may be implemented. For example, status module 520 and identification module 525 can be combined into a single module for determining the status of one or more corrosion monitoring systems 270.

Memory 505 can be any device, mechanism, or populated data structure used for storing information. In accordance with some embodiments of the present technology, memory 505 can encompass any type of, but is not limited to, volatile memory, nonvolatile memory and dynamic memory. For example, memory 505 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Memory 505 may be used to store instructions for running one or more applications or modules on processor(s) 510. For example, memory 505 could be used in one or more embodiments to house all or some of the instructions needed to execute the functionality of communications module 515, status module 520, identification module 525, data collection module 530, technician locator module 535, service request module 540, recordation module 545, analytics engine 550, prediction engine 555 and/or GUI generation module 560. While not shown in FIG. 12, in some embodiments, an operating system can be used to provide a software package that is capable of managing the hardware resources of monitoring platform 230. The operating system can also provide common services for software applications running on processor(s) 510.

Communications module 515 can be configured to manage and translate any requests from external devices (e.g., mobile devices 210, electronic device 215 corrosion monitoring systems 270, etc.) or from graphical user interfaces into a format needed by the destination component and/or system. Similarly, communications module 515 may be used to communicate between the system, modules, databases, or other components of monitoring platform 230 that use different communication protocols, data formats, or messaging routines. For example, in some embodiments, communications module 515 can receive measurements of the current state of one or more monitoring systems 270. Communications module 515 can be used to transmit status reports, alerts, logs, and other information to various devices.

Status module 520 can determine the status of the equipment being monitored, e.g., piping systems, corresponding to one or more corrosion monitoring systems 270. For example, status module 520 may use communications module 515 to directly request a status of equipment monitored by a monitoring system 270 from one or more gateways 400 or local processing units 235. Identification module 525 can be configured to receive sensor data and/or other information, as discussed above, generated by the monitoring system 270, e.g., sensor data and information generated by monitoring devices 100. Using the received sensor data and/or other information, identification module 525 can then identify an operational status of the equipment being monitored by the monitoring system 270, e.g., a piping system. The operational status and/or the sensor data itself can then be recorded within a monitoring profile in a database for the monitored equipment. As a result, the monitoring profile can provide a history of the operational status of the equipment monitored by the monitoring system 270 over time. In accordance with some embodiments, the operational status can include a functional status indicating that the equipment monitored by the monitoring system 270 should operate as expected, a maintenance status indicating when the monitored equipment should undergo maintenance and/or inspection, and an inoperative status indicating that the monitored equipment may not operate as expected.

Data received via communications module 515 can be accessed by data collection module 530 for processing, formatting, and storage. Data collection module 530 can keep track of the last communication from each of the corrosion monitoring systems 270 and generate an alert if any monitoring device 100 fails to report on schedule (e.g., every minute, every five minutes, or other preset schedule) and/or when a request is made. Data collection module 530 can also review the quality of the data received and identify any potential issues. For example, if a data set from a monitoring system 270 includes various sensor data, data collection module 530 can analyze the data to determine any erratic behavior or outliers that may indicate that a sensor is beginning to fail.

Technician locator module 535 can be configured to receive location and schedule updates from mobile devices 210 associated with technicians. Service request module 540 can be configured to identify when the operational status of the equipment monitored by monitoring system 270, e.g., a piping system, is inoperative and identify an available technician using the technician locator. As a technician is servicing the monitored equipment, he or she may use a computer application or a mobile application to report various findings, observations, parts replaced, and the like. As this information is transmitted to monitoring platform 230, recordation module 545 can record the information from the technician in the appropriate corrosion monitoring profile.

Analytics engine 550 can analyze the sensor data from one or more monitoring devices 100 and perform the functions discussed above with respect to corrosion rate circuit 134. The analytics engine can also generate a correlation model that is predictive of when a failure of the monitored equipment is likely, e.g., due to thinning pipe walls, predictive of when freezing of the equipment, e.g., pipes, is likely to occur, predictive of some other type of abnormal operating state of the equipment being monitored, predictive of when certain maintenance and/or inspection activities should occur, and/or predicts some other type of abnormal operating condition and/or inspection activity. The correlation model (or models) can be generated based on one or more of the following: sensor data relating to the electrical characteristic of each the corrosion sensors, e.g., coupon portions 106, the level of corrosion, and/or the rate of corrosion; other sensor data such as the temperature of the equipment environment (e.g., inside the pipe) and/or ambient temperature (e.g., outside the pipe), and/or the presence or absence of water; and other types of information such as the thickness of the equipment (e.g., the thickness of the piping wall), the equipment material, and/or observations from the technicians during inspections. Prediction engine 555 can be configured to process the sensor data in real-time against the correlation model or models generated by the analytics engine 550 and generate an alarm condition, an inspection request based on the information gathered from the sensors in the corrosion monitoring system 270, and/or determine the respective measurement intervals for the monitoring devices 100. For example, if the level and/or rate of corrosion is low, the time between maintenance inspections and/or measurement intervals can be extended. However, if the level and/or rate of corrosion starts to increase, the time between inspections and/or the measurement intervals can be decreased. The inspection of the piping system can be based on the number of freezing and thawing cycles the piping system experienced in a given time period. Analytics engine 550 can monitor the sensor data and generate other types of analytics. In some embodiments, part or all of the functions of analytics engine 550 and/or prediction engine 555 can be incorporated into local processing unit 235 and/or monitoring device 100.

GUI generation module 560 can generate one or more GUI screens that allow for interaction with a user. GUI generation module 560 can generate a graphical user interface allowing a user to set preferences, review reports, create profiles, set device constraints, and/or otherwise receive or convey information about device customization to the user. For example, GUI generation module 560 can be configured to retrieve, from the database, the information from the multiple corrosion monitoring profiles. Once the information has been retrieved, GUI generation module 560 can generate a graphical user interface allowing a user to see the operational status of any of the profiles of the equipment being monitored, e.g., via mobile device 210 and/or stationary electronic device 215. The information generated by the analytics engine 550 and/or the prediction engine 555 as discussed above can be sent to the user and/or are available to the user via the GUI screens.

Figure 13:
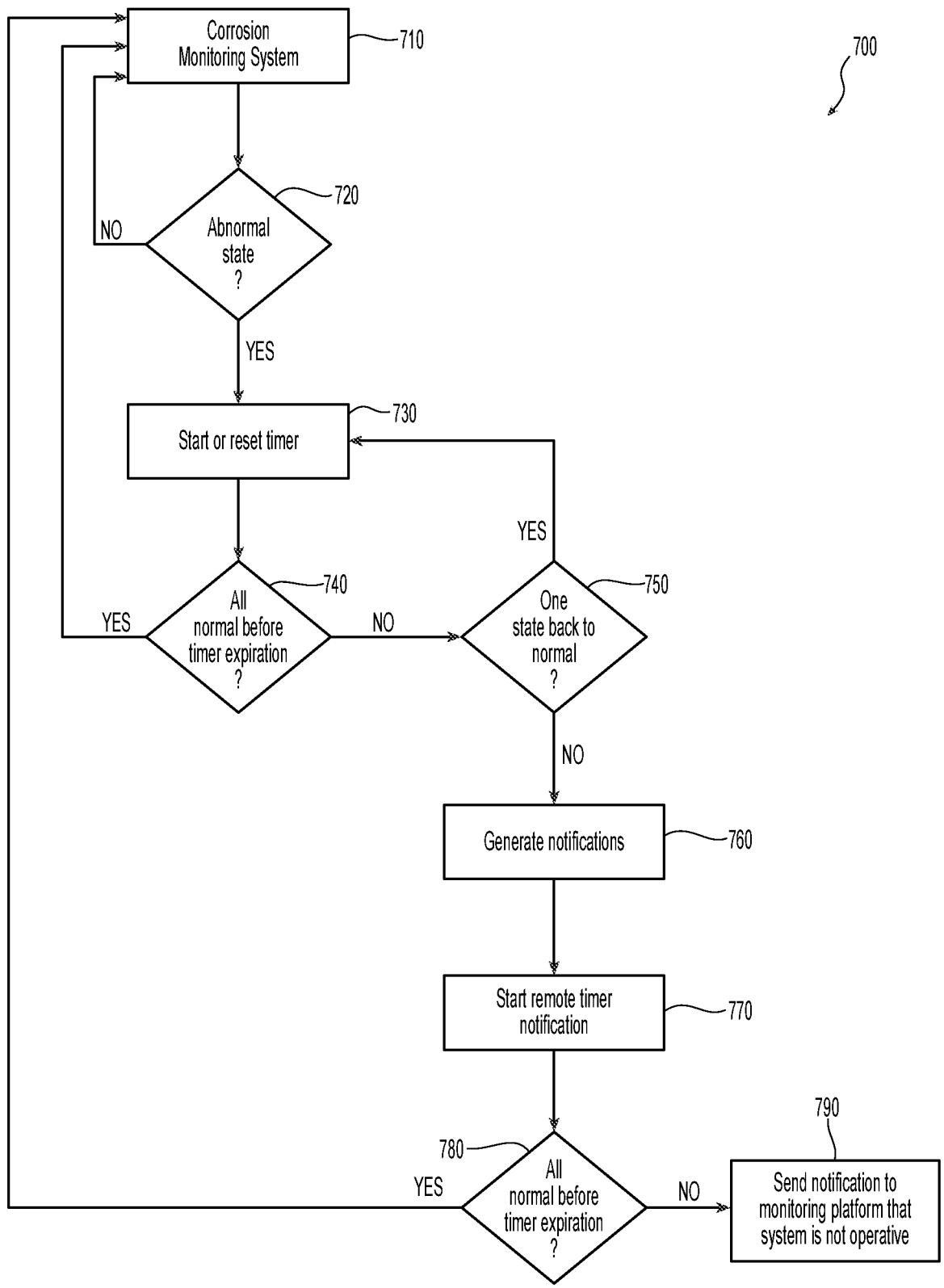
FIG. 13 is a flow diagram of a method of determining when to transmit a notification to a monitoring platform that the equipment being monitored is not fully operative.

FIG. 13 is flow diagram depicted a set of operations 700 for determining when to transmit a notification to a monitoring platform (e.g., monitoring platform 230) that the equipment monitored by the monitoring system 270, e.g. a piping system, is not fully operative and/or requires attention. In some embodiments, the operations depicted in FIG. 13 may be performed by various components of the monitoring system 270, including, but not limited to, one or more monitoring devices 100, one or more local processing units 235, and/or one or more gateway units 400 associated with the monitoring system 270.

As depicted in FIG. 13, monitoring operation 710 can monitor a monitoring system 270. For example, as the sensor signals and/or other information, as discussed above, from, e.g., monitoring devices 100 are received, determination operation 720 can determine if the monitored equipment, e.g., a piping system, and/or the associated monitoring system 270 is in an abnormal state. Examples of abnormal states can include the monitoring and conversion circuit 110 indicating abnormal sensor readings, the level and/or rate of corrosion is outside predetermined limits and/or predicts failure within a predetermined time period, the temperature of the equipment environment and/or ambient temperature predict abnormal freezing/thawing conditions, the presence of water where none should be, and/or the absence of water where there should be water, and the like. When determination operation 720 determines that the piping system/corrosion monitoring system 270 is in a normal state, determination operation 720 branches back to monitoring operation 710. When determination operation 720 determines that the piping system/corrosion monitoring system 270 is in an abnormal state, then determination operation 720 branches to timing operation 730 where a timer is initiated.

The amount of time set for the timer in timing operation 730 may be static (e.g., thirty seconds, five minutes, etc.) or dependent on the type of abnormal state that is detected. For example, an abnormal level and/or rate of corrosion condition can have a timer setting that is different from a timer setting for an abnormal temperature condition or a timer setting for an abnormal presence of water. In the event multiple abnormal states are detected, timing operation 730 may set the timer to the minimum time associate with the detected abnormalities or create a new time (e.g., an average or a weighted average).

Expiration operation 740 monitors the abnormal states and the timer. Upon expiration of the timer, if the abnormal states have all returned to normal, then expiration operation 740 branches to monitoring operation 710. If expiration operation 740 determines that the abnormal states have not all returned to normal, the expiration operation 740 branches to state evaluation operation 750 where a determination is made as to whether one or more states have returned to normal. When state evaluation operation 750 determines that one or more states have returned to normal, state evaluation operation 750 branches to timing operation 730 where a new timer is set. When state evaluation operation 750 determines that one or more states have not returned to normal, then state evaluation operation 750 can branch to generation operation 760 where one or more notifications can be sent to a technician and/or other party (e.g., building operator). The notifications may be sent via one or more communication channels. For example, lighting a display, text message, e-mail, automated phone call, fax, push notification, and/or the like.

Once the notifications have been generated, then remote timing operation 770 start a time for a specified period of time. The time set by remote timing operation 770 may be static or dynamic, as described above. Remote timing operation 770 may set the timer, at least in part, based on whether or not a response was from the technician and/or a third party in response to the notifications. Clearing operation 780 can determine whether all the states have returned to normal before the timer expires. When clearing operation 780 determines all states have returned to normal, then clearing operation 780 branches to monitoring operation 710. When clearing operation 780 determines that there is at least one remaining abnormal state, then clearing operation 780 branches to reporting operation 790 which sends one or more notifications to a monitoring platform 230 (or other device) that the piping system/corrosion monitoring system 270 is not operative or is an abnormal state.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A corrosion monitoring device to monitor corrosion in a pipe of a fire sprinkler system, comprising:
   a sensor assembly including a plug insert and at least one sensor portion comprising a plurality of coupon portions coupled with the plug insert and disposed in an interior of a pipe in a fire sprinkler system for sensing corrosion of a wall of the pipe, the plurality of coupon portions at least one of (i) U-shaped, (ii) oriented in parallel with one another, and (iii) intersecting a surface plane of the plug insert; and
   a detector circuit to:
      transmit an electrical signal through the at least one sensor portion;
      monitor an electrical characteristic of the at least one sensor portion based on the electrical signal;
      compare at least one of the monitored electrical characteristic and a change in the electrical characteristic of the at least one sensor portion to at least one of a predetermined value and a previously monitored electrical characteristic;
      determine a corrosion status indicative of at least one of a corrosion level and a rate of corrosion of the pipe wall based on the comparison; and
      output an indication of the corrosion status.

2. The device of claim 1, comprising:
   the electrical characteristic is at least one of a continuity of the at least one sensor portion, a resistance value of the at least one sensor portion, a voltage value at a predetermined location of the at least one sensor portion, a voltage drop across the at least one sensor portion, a current value through the at least one sensor portion, and an inductance value of the at least one sensor portion.

3. The device of claim 1, comprising:
   a power source providing a voltage having a second predetermined value;
   a relay circuit that connects a first end of the at least one sensor portion to the power source and a second end of the at least one sensor portion to the detector circuit; and
   the electrical characteristic is a continuity of the at least one sensor portion.

4. The device of claim 1, comprising:
   a power source providing a voltage having a second predetermined value; and
   a relay circuit that connects a first end of the at least one sensor portion to the power source and a second end of the at least one sensor portion to the detector circuit;
   the electrical characteristic is a continuity of the at least one sensor portion, the continuity indicating whether the respective sensor portion is open circuited or not; and
   the detector circuit determines the continuity of each sensor portion based on a voltage measurement at the second end of the at least one sensor portion.

5. The device of claim 1, comprising:
   each coupon portion of the plurality of coupon portions corrodes at a rate that can be correlated to a rate of corrosion of the pipe wall.

6. The device of claim 1, comprising:
   at least one surface area of a particular coupon portion of the plurality of coupon portions is different from the surface areas of the other coupon portions of the plurality of coupon portions.

7. The device of claim 1, comprising:
   the sensor assembly includes at least four sensor portions that are coupon portions, with each coupon portion having a different surface area than the other coupon portions.

8. The device of claim 1, comprising:
   a geometric shape of each coupon portion of the plurality of coupon portions is a cylindrical shape.

9. The device of claim 1, comprising:
   a corrosion rate circuit to calculate at least one of the level of corrosion and the rate of corrosion for the pipe wall based on an estimated loss of weight of the at least one sensor portion.

10. A corrosion monitoring device to monitor corrosion in a pipe of a fire sprinkler system, comprising:
    a sensor assembly including at least one sensor portion disposed in an interior of a pipe in a fire sprinkler system for sensing corrosion of a wall of the pipe; and a detector circuit to:
  transmit an electrical signal through the at least one sensor portion;
  monitor an electrical characteristic of the at least one sensor portion based on the electrical signal;
  compare at least one of the monitored electrical characteristic and a change in the electrical characteristic of the at least one sensor portion to at least one of a predetermined value and a previously monitored electrical characteristic;
  determine a corrosion status indicative of at least one of a corrosion level and a rate of corrosion of the pipe wall based on the comparison; and
output an indication of the corrosion status;
a temperature sensor disposed such that the temperature sensor senses a temperature of the interior of the pipe; and
a temperature monitoring circuit, the temperature monitoring circuit configured to receive a signal from the temperature sensor and determine whether water in the pipe will freeze based on the temperature of the interior of the pipe.

11. The device of claim 10, comprising:
the temperature monitoring circuit configured to receive a signal from an ambient temperature sensor measuring an ambient temperature outside of the pipe and determine whether the water in the pipe will freeze based on the temperature in the interior of the pipe and the ambient temperature.

12. The device of claim 11, comprising:
the temperature monitoring circuit is configured to issue a freeze alert if the ambient temperature is less than a freeze point of the water in the pipe.

13. The device of claim 10, comprising:
the temperature monitoring circuit is configured to receive a signal from an ambient temperature sensor measuring an ambient temperature outside of the pipe, determines whether the water in the pipe will freeze based on the temperature in the interior of the pipe and the ambient temperature, and issues a freeze alert if the temperature of the interior of the pipe is less than a third predetermined value and the ambient temperature is less than the temperature of the interior of the pipe.

14. A corrosion monitoring device to monitor corrosion in a pipe of a fire sprinkler system, comprising:
a sensor assembly including at least one sensor portion disposed in an interior of a pipe in a fire sprinkler system for sensing corrosion of a wall of the pipe; and
a detector circuit to:
  transmit an electrical signal through the at least one sensor portion;
  monitor an electrical characteristic of the at least one sensor portion based on the electrical signal;
  compare at least one of the monitored electrical characteristic and a change in the electrical characteristic of the at least one sensor portion to at least one of a predetermined value and a previously monitored electrical characteristic;
  determine a corrosion status indicative of at least one of a corrosion level and a rate of corrosion of the pipe wall based on the comparison;
output an indication of the corrosion status; and
measure a resistance between any two coupon portions of the plurality of coupon portions and determine a presence or absence of water in the pipe based on the measurement.

* * * * *